US012430769B2

(12) United States Patent
Azuma

(10) Patent No.: US 12,430,769 B2
(45) Date of Patent: *Sep. 30, 2025

(54) ANNOUNCE APPARATUS AND METHOD FOR SUPPORT-NEEDING USER

(71) Applicant: NEC Corporation, Tokyo (JP)

(72) Inventor: Tomohiro Azuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,067

(22) Filed: Apr. 9, 2024

(65) Prior Publication Data

US 2024/0257355 A1    Aug. 1, 2024

Related U.S. Application Data

(63) Continuation of application No. 17/270,517, filed as application No. PCT/JP2019/033868 on Aug. 29, 2019, now Pat. No. 11,983,878.

(30) Foreign Application Priority Data

Aug. 30, 2018 (JP) ................. 2018-161731

(51) Int. Cl.
G06T 7/11       (2017.01)
G06Q 50/40      (2024.01)
G08G 1/005      (2006.01)

(52) U.S. Cl.
CPC ............ *G06T 7/11* (2017.01); *G06Q 50/40* (2024.01); *G08G 1/005* (2013.01); *G06T 2207/30252* (2013.01)

(58) Field of Classification Search
CPC . G06T 7/11; G06T 2207/30252; G08G 1/005; B60L 15/0081; G06Q 50/30; G06Q 50/40; B61L 15/0081
See application file for complete search history.

(56) References Cited

U.S. PATENT DOCUMENTS 11,983,878 B2 *  5/2024  Azuma ................ G06T 7/11
2019/0039634 A1  2/2019  Tokumaru
(Continued)

FOREIGN PATENT DOCUMENTS

JP    2004-164302 A    6/2004
JP    2009-187054 A    8/2009
(Continued)

OTHER PUBLICATIONS

International Search Report for PCT Application No. PCT/JP2019/033868, mailed on Dec. 3, 2019.
(Continued)

*Primary Examiner* — John A Tweel, Jr.

(57) ABSTRACT

An announce apparatus comprises an analysis part that obtains a capture image capturing at least any one of an area including a boarding position at a station or inside of a vehicle so as to determine, based on the capture image, whether a person who needs support (termed hereinafter as "support-needing user") will board on/off the vehicle; and an announce part that announces boarding on/off support information relating to the support-needing user when the analysis part determines that the support-needing user will board on/off the vehicle.

9 Claims, 20 Drawing Sheets

(56) References Cited

U.S. PATENT DOCUMENTS

| | | | |
|---|---|---|---|
| 2019/0114563 A1 | 4/2019 | Yukimoto | |
| 2020/0410408 A1 | 12/2020 | Shitara | G06Q 50/30 |
| 2021/0166164 A1 | 6/2021 | Proctor | G08Q 10/0633 |
| 2022/0281485 A1 | 9/2022 | Murakami | G06N 7/01 |
| 2023/0046952 A1 | 2/2023 | Saikawa | B61L 27/16 |

FOREIGN PATENT DOCUMENTS

| | | |
|---|---|---|
| JP | 2009-258835 A | 11/2009 |
| JP | 2010-086098 A | 4/2010 |
| JP | 2012-046144 A | 3/2012 |
| JP | 2013-101652 A | 5/2013 |
| JP | 2015-016704 A | 1/2015 |
| JP | 2016-062414 A | 4/2016 |
| JP | 2016-099993 A | 5/2016 |
| JP | 2016-168876 A | 9/2016 |
| WO | 2013/011742 A1 | 1/2013 |
| WO | 2017/168585 A1 | 10/2017 |
| WO | 2018/096371 A1 | 5/2018 |
| WO | 2018/123843 A1 | 7/2018 |

OTHER PUBLICATIONS

Extended European Search Report for EP Application No. 19854635.0 dated on Sep. 28, 2021.

* cited by examiner

FIG. 2
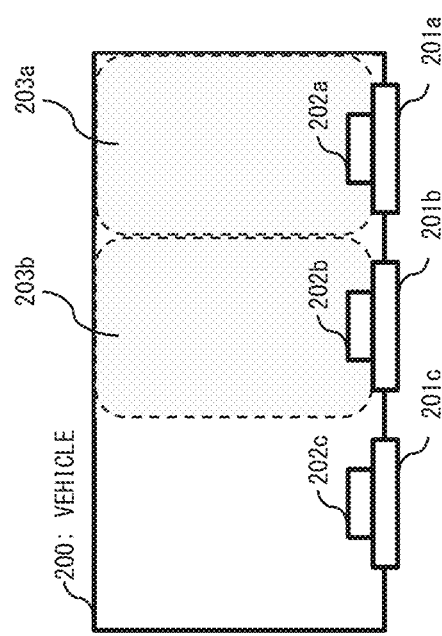
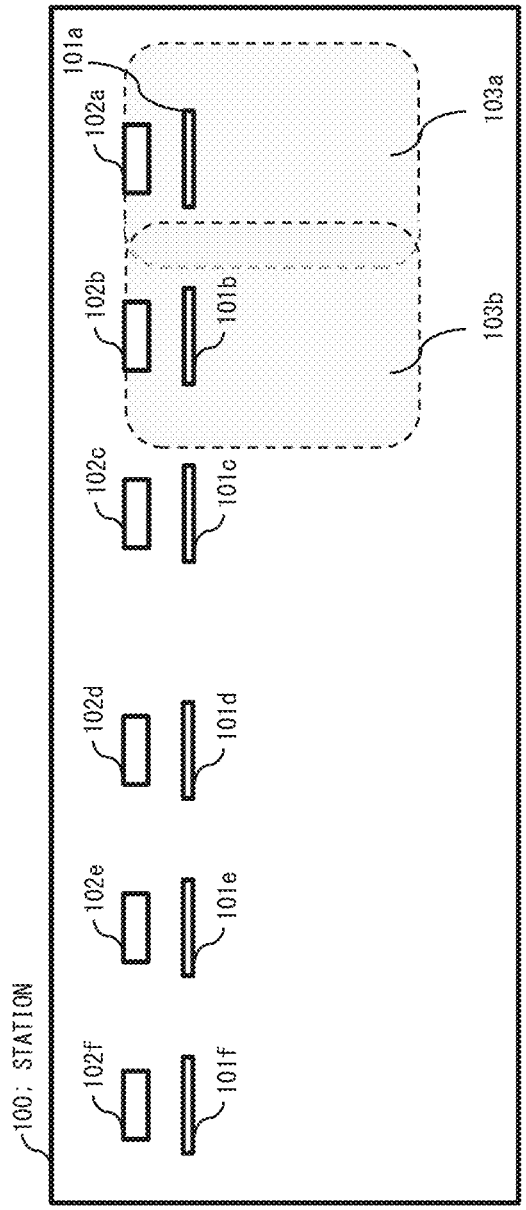

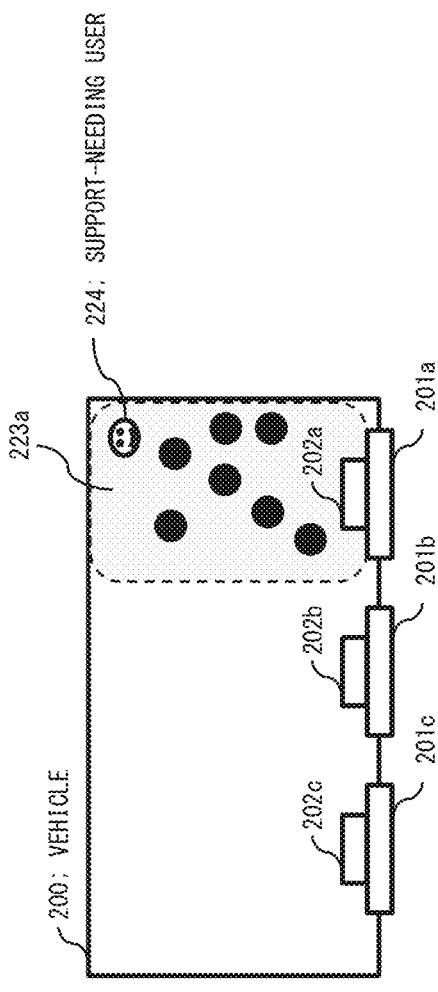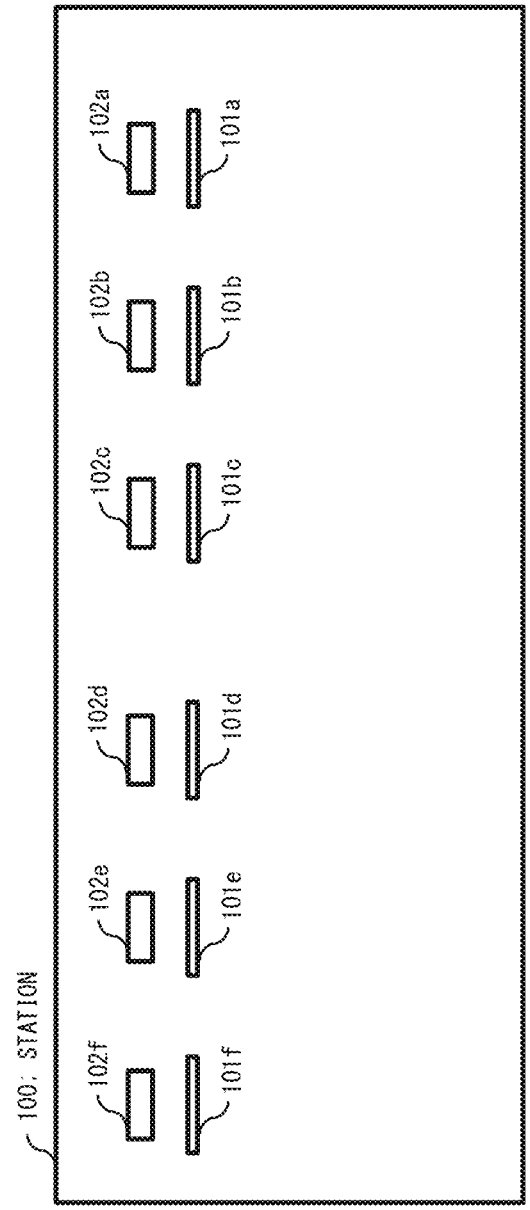
FIG. 4

FIG. 7

| STATION | DESTINATION | ARRIVAL/ DEPARTURE SCHEDULE | VEHICLE TYPE | TRAIN FORMARTION (NUMBER OF VEHICLES) | ANNOUNCE APPARATUS CONCORDANCE INFORMATION : (STATION-SIDE APPARATUS IDENTIFICATION INFORMATION, VEHICLE-SIDE APPARATUS IDENTIFICATION INFORMATION) |
|---|---|---|---|---|---|
| X STATION | P STATION | 12:00 | AA01 | 4 | (1-A, 1-a), (1-C, 1-c), (1-E, 1-e) |
|  |  |  |  |  | (2-A, 1-a), (2-C, 2-c), (2-E, 2-e) |
|  |  |  |  |  | (3-A, 3-a), (3-C, 3-c), (3-E, 3-e) |
|  |  |  |  |  | (4-A, 4-a), (4-C, 4-c), (4-E, 4-e) |
|  | Q STATION | 12:05 | AA01 | 4 | (4-F, 4-f), (4-D, 4-d), (4-B, 4-b) |
|  |  |  |  |  | (3-F, 3-f), (3-D, 3-d), (3-B, 3-b) |
|  |  |  |  |  | (2-F, 2-f), (2-D, 2-d), (2-B, 2-b) |
|  |  |  |  |  | (1-F, 1-f), (1-D, 1-d), (1-B, 1-b) |

ANNOUNCE APPARATUS AND METHOD FOR SUPPORT-NEEDING USER

CROSS-REFERENCE TO RELATED APPLICATION

This application is a continuation application of U.S. patent application Ser. No. 17/270,517 filed on Feb. 23, 2021, which is a National Stage Entry of PCT/JP2019/033868 filed on Aug. 29, 2019, which claims priority from Japanese Patent Application 2018-161731 filed on Aug. 30, 2018, the contents of all of which are incorporated herein by reference, in their entirety.

FIELD

The present invention relates to an announce apparatus, an announce control apparatus, an announce system, an announce method and a program.

BACKGROUND

There is a case where a wheelchair user, a crutch user, a white cane user, an old person, a person who holds an infant, a pregnant woman and the like have difficulty in boarding on/off a vehicle when he uses a public transport. Therefore, there is a case where such user needs support by surrounding passengers when he boards on/off the vehicle. In such case, it is desired that a pertinent support is easily provided to the user who is desired to be provided with support when he uses the public transport (hereinafter, referred to as "support-needing user").

However, there are cases where the support-needing user is not provided with pertinent support when he boards on/off the vehicle, because care (support) for the support-needing user at a station and in the vehicle is largely dependent on conscience and notice by passengers other than the support-needing user.

Patent Literature (PTL) 1 discloses a technology in which a reading apparatus arranged at a gate of a public transport vehicle reads a non-contact IC (Integrated Circuit) medium held by the support-needing user and notifies passengers and an operation manager of that the support-needing user will board on or off the vehicle.

PTL 1: JP Patent Kokai Publication No. JP2016-099993A

SUMMARY

Herein, it is deemed that, the disclosure of the Prior art document is incorporated by reference into the present application. The following analyses have been made by the present invention.

As described above, it is desired that a pertinent support is easily provided at a station and in a vehicle.

In the technology disclosed in PTL 1, it is required that the support-needing user holds a predetermined non-contact IC medium for receiving support. Therefore, in the technology disclosed in PTL 1, if the support-needing user does not hold the predetermined non-contact IC medium, the passengers and the operation manager are not notified that he will board on/off the public transport vehicle, even he is the support-needing user. In addition, in the technology disclosed in PTL 1, it is required that the support-needing user has previously purchased the predetermined non-contact IC medium and the like, for receiving support. Therefore, in a case where the technology disclosed in PTL 1 is used, there is a possibility that a complicate operation for the support-needing user is required.

Accordingly, it is a purpose of the present invention to provide an announce apparatus, an announce control apparatus, an announce system, an announce method and a program, which contribute to increase a possibility that the support-needing user is easily provided with support when he uses the public transport.

According to a first aspect, there is provided an announce apparatus. The announce apparatus comprises an analysis part that obtains a capture image capturing at least any one of an area including a boarding position at a station or inside of a vehicle so as to determine, based on the capture image, whether (or not) a person who needs support (support-needing user) will board on/off the vehicle. Further, the announce apparatus comprises an announce part that announces boarding on/off support information relating to the support-needing user when the analysis part determines that the support-needing user will board on/off the vehicle.

According to a second aspect, there is provided an announce control apparatus. The announce control apparatus comprises a control apparatus analysis part that obtains at least any one of a capture image capturing an area including a boarding position at a station and a capture image capturing inside of a vehicle so as to determine whether or not a support-needing user will board on/off the vehicle. Further, the announce control apparatus comprises a control apparatus communication part that notifies at least any one of a station-side announce apparatus and a vehicle-side announce apparatus of boarding on/off support information relating to the support-needing user.

According to a third aspect, there is provided an announce system. The announce system is configured by comprising a station-side announce apparatus and a vehicle-side announce apparatus. The station-side announce apparatus comprises a first analysis part that obtains a first capture image capturing an area including a boarding position at a station so as to determine, based on the first capture image, whether or not a first person who needs support (first support-needing user) will board on a vehicle. Further, the station-side announce apparatus comprises a first announce part that announces boarding on/off support information relating to the first support-needing user when the first analysis part determines that the first support-needing user will board on the vehicle.

The vehicle-side announce apparatus comprises a second analysis part that obtains a second capture image capturing inside of a vehicle so as to determine, based on the second capture image, whether or not a second person who needs support (second support-needing user) will board off the vehicle. Further, the vehicle-side announce apparatus comprises a second announce part that announces boarding on/off support information relating to the second support-needing user when the second analysis part determines that the second support-needing user will board off the vehicle.

According to a fourth aspect, there is provided an announce method. The announce method comprises obtaining a capture image capturing at least any one of an area including a boarding position of a station or inside of a vehicle. Further, the announce method comprises determining, based on the capture image, whether (or not) a person who needs support (support-needing user) will board on/off the vehicle. Further, the announce method comprises announcing boarding on/off support information relating to the support-needing user when it is determined that the support-needing user will board on/off the vehicle.

Herein, the method is associated to a specific machine as the announce apparatus.

According to a fifth aspect, there is provided a program. The program causes a computer configured to control an announce apparatus to execute a process of obtaining a capture image capturing at least any one of an area including a boarding position of a station or inside of a vehicle. Further, the program causes the computer to execute a process of determining, based on the capture image, whether (or not) a person who needs support (support-needing user) will board on/off the vehicle. Further, the program causes the computer to execute a process of boarding announcing on/off support information relating to the support-needing user when it is determined that the support-needing user will board on/off the vehicle.

Herein, these programs may be stored in a computer-readable storage medium. The storage medium may be a non-transient medium, such as a semiconductor memory, a hard disk, a magnetic recording medium, alternatively an optical recording medium. The present invention may be realized (implemented) as a computer program product. In addition, each aspect of the present invention may be realized (implemented) by an apparatus comprising at least a computer and a memory throughout the first to fifth aspects, and the memory stores a program (s) to be executed by the computer.

According to each of the aspects, there are provided the announce apparatus, the announce control apparatus, the announce system, the announce method and the program that contribute to increase the possibility that the support-needing user is easily provided with support when he uses a public transport.

BRIEF DESCRIPTION OF THE DRAWINGS

FIG. 2 is a block diagram showing an example of entire configuration of an announce system of first to third example embodiments.

FIG. 4 is a diagram showing a situation in which the plurality of passengers including the support-needing user 224 are on the vehicle 200.

FIG. 7 is a diagram showing an example of management information.

PREFERRED MODES

Figure 1:
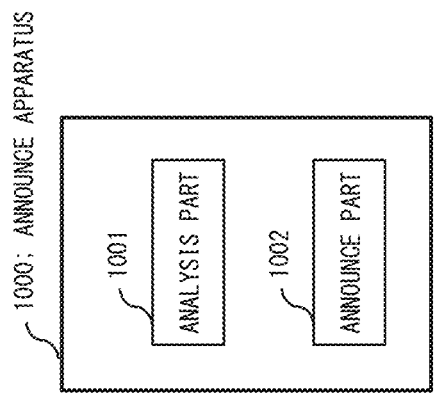
FIG. 1 is an explanatory view of an outline of one example embodiment.

First, an outline of one example embodiment is explained using FIG. 1. Herein, reference signs described in the outline is expediently appended to each element as one example for an explanatory aid for understanding. It is not intended that the outline provides any limitations. In addition, a connection line between blocks in each drawing includes both of bidirectional and monodirectional connections. One-way arrow schematically indicates a main signal (data) flow, but not excluding bidirectional flows. Further, although explicit descriptions (apparent illustrations) are omitted in circuit diagrams, block diagrams, inner configuration diagrams, connection diagrams and the like referred to in the present application, input ports and output ports are present at both of an input end and an output end of each of the connection line. The same is applied to an input/output interface.

As described above, an announce apparatus is desired, which contributes to increase a possibility that a support-needing user is easily provided with support when he uses a public transport.

Therefore, there is provided an announce apparatus 1000 illustrated in FIG. 1, as one example. The announce apparatus 1000 comprises an analysis part 1001 and an announce part 1002.

The analysis part 1001 obtains a capture image capturing at least any one of an area including a boarding position at a station or inside of a vehicle. In addition, the analysis part 1001 determines whether (or not) that a person who needs support (termed herein as "support-needing user") will board on/off the vehicle based on the obtained capture image. The support-needing user is, for example, a wheelchair user, a crutch user, a white cane user, an old person, a person who holds an infant, a pregnant woman (for example, a person who bears a maternity mark), a person who notifies surrounding persons that he needs support (for example, a person who bears a help mark) and the like.

Concretely, the analysis part 1001 obtains the capture image capturing the area including the boarding position at the station so as to determine whether or not that the support-needing user will board on the vehicle based on the obtained capture image. Or, the analysis part 1001 obtains the capture image capturing inside of the vehicle so as to determine whether or not that the support-needing user will board off the vehicle based on the obtained capture image.

When the analysis part 1001 determines that the support-needing user will board on/off the vehicle, the announce part 1002 provides notification (display, announce) of boarding on/off support information relating to the support-needing user. Concretely, when the analysis part 1001 determines that the support-needing user will board on the vehicle, the announce part 1002 announces the boarding on/off support information relating to the support-needing user. Or, when the analysis part 1001 determines that the support-needing user will board off the vehicle, the announce part 1002 announces the boarding on/off support information relating to the support-needing user.

For example, assume that the announce apparatuses 1000 are arranged at the station and in the vehicle. In such case, by virtue that the announce apparatuses 1000 announce the boarding on/off support information relating to the support-needing user, the possibility is increased that passengers at the station and in the vehicle notice that the support-needing user will board on/off the vehicle.

Further, the announce apparatus 1000 determines whether or not that the support-needing user will board on/off the vehicle based on the capture image capturing at least any one of the areas including the boarding position at the station or inside of the vehicle. Therefore, the announce apparatus 1000 determines whether or not that the support-needing user will board on/off the vehicle without requesting complicated operations to the support-needing user.

Accordingly, the announce apparatus 1000 contributes to increase the possibility that the support-needing user is easily provided with support when he uses the public transport.

First Example Embodiment

A first example embodiment will be explained in detail while referring to the drawings. In the following explanation, a railroad (train) is exemplified for explanation. However, it is not intended to limit the present example embodiment to the railroad (train).

FIG. 2 is a diagram showing an example of an announce system of the present example embodiment. FIG. 2 illustrates a situation where a vehicle (train) 200 entered a rail track at a station.

Assume that, the station 100 comprises indicators indicating positions of vehicle doors of a train that has been stopped (hereinafter, referred to as boarding position(s) 101). For example, boarding positions 101*a* to 101*f* may be a line drawn on the floor of the station 100.

Assume that, the station 100 is further provided with station-side announce apparatuses 102*a* to 102*f* which are respectively assigned to the boarding positions 101*a* to 101*f*. Assume that, passengers who intend to board on the train stand in lines at positions waiting for the train, where they face the station-side announce apparatuses 102*a* to 102*f* interposed with boarding positions 101*a* to 101*f*.

The station-side announce apparatuses 102*a* to 102*f* are apparatuses that announce information to the passengers at the station 100, which are configured by comprising announce means, such as an LCD (Liquid Crystal Display) panel, a loudspeaker and the like.

Further, the station-side announce apparatuses 102*a* to 102*f* obtain capture images from cameras that shoot images of areas including the boarding positions 101*a* to 101*f* assigned thereto. For example, the station-side announce apparatuses 102*a* to 102*f* may be configured by comprising the cameras. Or, they may obtain the capture images from cameras arranged near the station-side announce apparatuses 102*a* to 102*f*. Assume that, the areas 103*a*, 103*b* surrounded by broken lines illustrated in FIG. 2 respectively indicate capture ranges by cameras assigned to the station-side announce apparatuses 102*a*, 102*b*. Even though being omitted in the figure, assume that, the cameras assigned to the station-side announce apparatuses 102*c* to 102*f* have equivalent capture ranges including the boarding positions 101*c* to 101*f* similarly to the areas 103*a*, 103*b*.

The station-side announce apparatuses 102*a* to 102*f* may be arranged above the boarding positions 101*a* to 101*f*. The station-side announce apparatuses 102*a* to 102*f* may be configured in an integrated manner with display apparatuses that display information relating to arrival/departure schedule and service status of the trains, and the like.

The vehicle (train) 200 comprises vehicle doors 201*a* to 201*c*. Assume that, vehicle-side announce apparatuses 202*a* to 202*c* are respectively arranged above the vehicle doors 201*a* to 201*c* in the vehicle 200.

The vehicle-side announce apparatuses 202*a* to 202*c* are apparatuses that announce information to passengers on the vehicle 200, which are configured by comprising announce means, such as an LCD panel, a loudspeaker and the like.

Further, the vehicle-side announce apparatuses 202*a* to 202*c* obtain capture images from cameras shooting images of inside of the vehicle 200. For example, the vehicle-side announce apparatuses 202*a* to 202*c* may be configured by comprising the cameras. Or, they may obtain capture images from cameras arranged near the vehicle-side announce apparatuses 202*a* to 202*c*. Assume that, the areas 203*a*, 203*b* surrounded by broken lines illustrated in FIG. 2 respectively indicate capture ranges by the cameras assigned to the vehicle-side announce apparatuses 202*a*, 202*b*. Even though being omitted in the figure, assume that, the camera assigned to the vehicle-side announce apparatus 202*c* also has a predetermined capture range that faces the vehicle door 201*c* similarly to the areas 203*a*, 203*b*.

In the following explanation, the boarding positions 101*a* to 101*f* are referred to as "boarding position (s) 101", if it is not required to discriminate them one another. In addition, in the following explanation, the station-side announce apparatuses 102*a* to 102*f* are referred to as "station-side announce apparatus (s) 102", if it is not required to discriminate them one another. In addition, in the following explanation, the vehicle doors 201*a* to 201*c* are referred to as "vehicle door(s) 201", if it is not required to discriminate them one another. In addition, in the following explanation, the vehicle-side announce apparatuses 202*a* to 202*c* are referred to as "vehicle-side announce apparatus(es) 202" if it is not required to discriminate them one another. Further, although FIG. 2 illustrates one vehicle 200 of a train for expedient explanation, it is not intended to limit the announce system of the present example embodiment to that directed to a vehicle of a single-vehicle train. It is, of course, that the announce system of the present example embodiment may be directed to a train comprising a plurality of vehicles. Further, although FIG. 2 illustrates 3 vehicle doors 201*a* to 201*c* as one example, it is not intended to limit the number of the vehicle doors 201 to 3.

During the vehicle travels and/or stops, communication is executed between the station-side announce apparatus 102 and the vehicle-side announce apparatus 202 assigned to the boarding position 101 and the vehicle door 201 which registers one another under a situation where the vehicle 200 stops at the station 100. For example, under a situation where the vehicle 200 stops at the station, assume that, the boarding positions 101*a* to 101*c* are [respectively] registered to [confronted with] the vehicle doors 201*a* to 201*c*. In such case, communication is executed between the station-side announce apparatus 102 and the vehicle-side announce apparatus 202 assigned to the boarding positions 101*a* to 101c and the vehicle doors 201a to 201c during the vehicle travels and/or stops. That is, the station-side announce apparatus 102a communicates with the vehicle-side announce apparatus 202a during the vehicle travels and/or stops. In addition, the station-side announce apparatus 102b communicates with the vehicle-side announce apparatus 202b during the vehicle travels and/or stops. In addition, the station-side announce apparatus 102c communicates with the vehicle-side announce apparatus 202c during the vehicle travels and/or stops.

The station-side announce apparatus 102 and the vehicle-side announce apparatus 202 provide display and announce for urging [surrounding passengers, i.e., potential supporters] to care [support] a person who needs (someone's) support (hereinafter, referred to as "support-needing user"). For example, the station-side announce apparatus 102 and the vehicle-side announce apparatus 202 provides notification (display, announce) of information including at least one selected from a notification that support-needing user will board on/off the vehicle, a position of the support-needing user, a property of the support-needing user as boarding on/off support information relating to the support-needing user. Herein, the property of the support-needing user may be information indicating the state of the support-needing user, such as a wheelchair user, a crutch user, a white cane user, an old person, a person who holds an infant, a pregnant woman (for example, a person who bears a maternity mark), a person who notifies surrounding persons that he needs support (for example, a person who bears a help mark), and the like. Herein, these are examples of the property of the support-needing user, thus it is not intended to limit the property of the support-needing user to the wheelchair user, the crutch user, the white cane user, the old person, the person who holds an infant, the pregnant woman, the person who notifies surrounding persons that he needs support.

Figure 3:
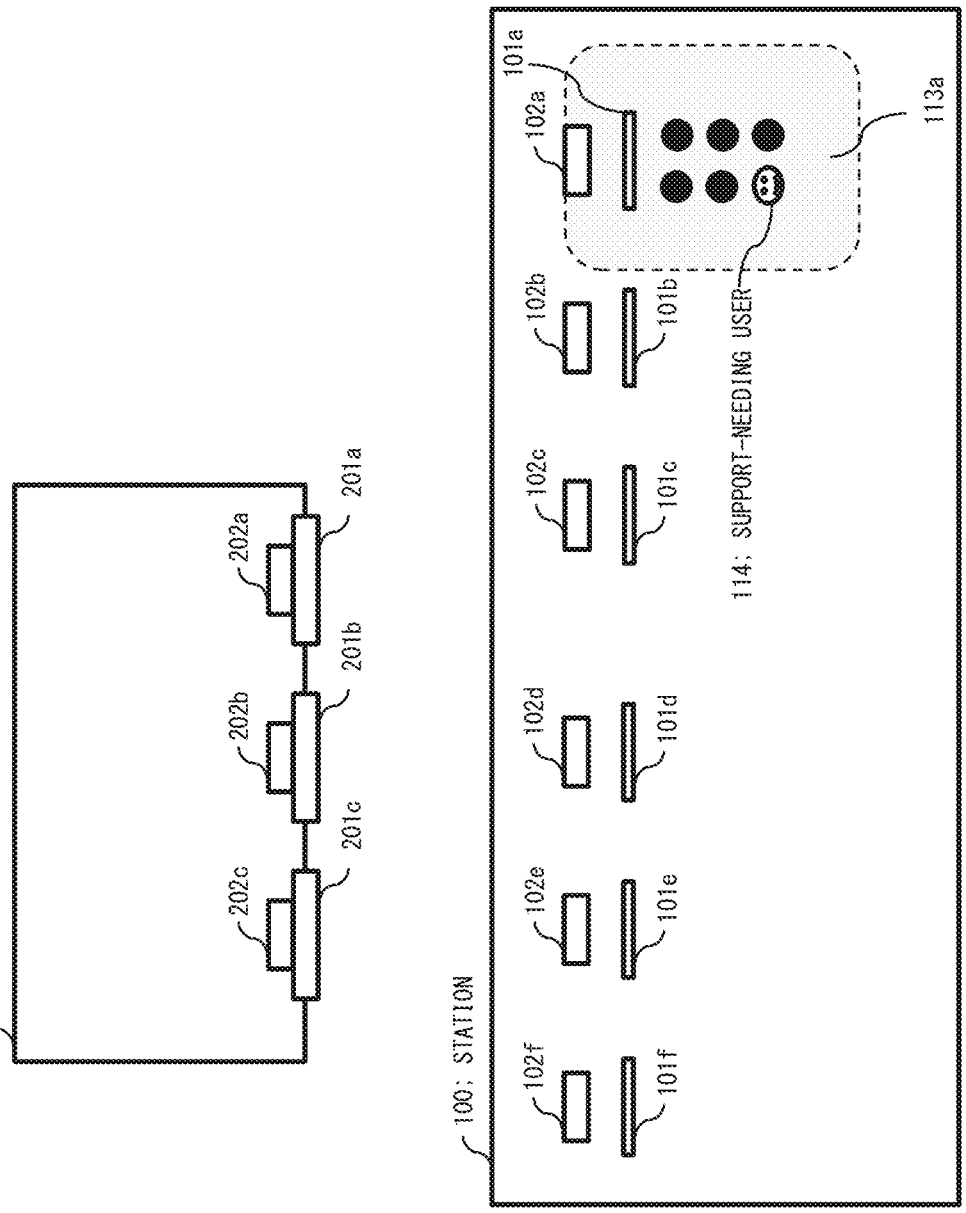
FIG. 3 is diagram showing an example of a situation in which passengers including the support-needing user 114 wait for a vehicle 200 at a station 100.

Next, while referring to FIG. 3, a case where passengers including a support-needing user 114 stand in lines waiting for the vehicle 200 at the station 100 is explained. Assume that, black circles "●" illustrated in FIG. 3 indicate passengers who do not need any supports upon boarding on the vehicle 200. As illustrated in FIG. 3, the support-needing user 114 waits for the train at the rearmost end (rear side) of a passengers-queue.

Herein, assume that, the capture range of the camera assigned to the station-side announce apparatus 102a is the area 113a surrounded by a broken line in FIG. 3. In such case, the station-side announce apparatus 102a detects the support-needing user 114 from a capture image based on his appearance feature (character). In addition, the station-side announce apparatus 102a announces the boarding on/off support information relating to the support-needing user 114.

Concretely, the station-side announce apparatus 102a announces information including at least one selected from notification that the support-needing user 114 will board on the vehicle, the position of the support-needing user 114 and the property of the support-needing user 114 as the boarding on/off support information relating to the support-needing user 114.

By virtue that the station-side announce apparatus 102a announces the boarding on/off support information relating to the support-needing user 114, a possibility is increased that persons being at the station 100 [i.e., potential supporters] notice the presence of the support-needing user 114. As a result, a possibility is increased that the support-needing user 114 receives support by the persons being at the station 100 when he boards on the vehicle. For example, the station-side announce apparatus 102a announces the boarding on/off support information relating to the support-needing user 114, resulting in that a possibility is increased that the support-needing user 114 may board on the vehicle at priority.

Further, the station-side announce apparatus 102a transmits the boarding on/off support information relating to the support-needing user 114 to the vehicle-side announce apparatus 202a in a case where the station-side announce apparatus 102a detects the support-needing user 114. When the vehicle-side announce apparatus 202a receives the boarding on/off support information relating to the support-needing user 114, it announces the boarding on/off support information relating to the support-needing user 114 to passengers on the vehicle 200.

By virtue that the vehicle-side announce apparatus 202a announces the boarding on/off support information relating to the support-needing user 114, it can let the passengers on the vehicle 200 (particularly, passengers near the vehicle door 201a) recognize that the support-needing user 114 will board on the vehicle. As a result, a possibility is increased that the support-needing user 114 receives support by the passengers in the vehicle 200 (particularly, passengers near the vehicle door 201a) when he boards on the vehicle.

Next, while referring to FIG. 4, a case where a plurality of passengers including a support-needing user 224 are present on the vehicle 200 is explained. Assume that, black circles "●" illustrated in FIG. 4 indicate passengers who do not need any supports. As illustrated in FIG. 4, the support-needing user 224 is present on the vehicle at a position away from a vehicle door 201a.

Herein, assume that, the capture range of the camera assigned to the vehicle-side announce apparatus 202a is an area 223a surrounded by a broken line in FIG. 4. In such case, the vehicle-side announce apparatus 202a detects the support-needing user 224 from a capture image based on his appearance feature. In addition, the vehicle-side announce apparatus 202a monitors the support-needing user 224 so as to determine behaviors of the support-needing user 224 based on the capture images. In addition, the vehicle-side announce apparatus 202a determines whether the support-needing user 224 intends to board off the vehicle based on the behaviors of the support-needing user 224. When the vehicle-side announce apparatus 202a determines that the support-needing user 224 intends to board off the vehicle, it announces the boarding on/off support information relating to the support-needing user 224.

Concretely, the vehicle-side announce apparatus 202a announces information including at least one selected from notification that the support-needing user 224 will board off the vehicle, the position of the support-needing user 224 and the property of support-needing user 224 as the boarding on/off support information relating to the support-needing user 224.

By virtue that the vehicle-side announce apparatus 202a announces the boarding on/off support information relating to the support-needing user 224, a possibility is increased that the passengers on the vehicle 200 notice the presence of the support-needing user 224. As a result, a possibility is increased that the support-needing user 224 receives support by the passengers on the vehicle 200 when the support-needing user 224 boards off the vehicle. For example, by virtue that the vehicle-side announce apparatus 202a announces the boarding on/off support information relating to the support-needing user 224, a possibility is increased that the passengers make a path reaching the vehicle door 201a for the support-needing user 224. Thereby, the possibility is increased that the support-needing user 224 can smoothly board off the vehicle.

Further, when the vehicle-side announce apparatus 202a determines that the support-needing user 224 intends to board off the vehicle, the vehicle-side announce apparatus 202a transmits the boarding on/off support information relating to the support-needing user 224 to the station-side announce apparatus 102a. When the station-side announce apparatus 102a receives the boarding on/off support information relating to the support-needing user 224, the station-side announce apparatus 102a announces the boarding on/off support information relating to the support-needing user 224 to the passengers who are at the station 100.

By virtue that the station-side announce apparatus 102a announces the boarding on/off support information relating to the support-needing user 224, it can let the passengers a t the station 100 (particularly, the passengers near the boarding position 101a) recognize that the support-needing user 224 will board off the vehicle. As a result, a possibility is increased that the support-needing user 224 receives support by the passengers at the station 100 (particularly, the passengers standing near the boarding position 101a) when he boards off the vehicle.

Next, the station-side announce apparatus 102 is explained in detail. Herein, in the following explanation, a configuration is exemplified for explanation where the station-side announce apparatus 102 comprises a camera. However, it is not intended to limit the configuration of the station-side announce apparatus 102 to that comprising the camera.

Figure 5:
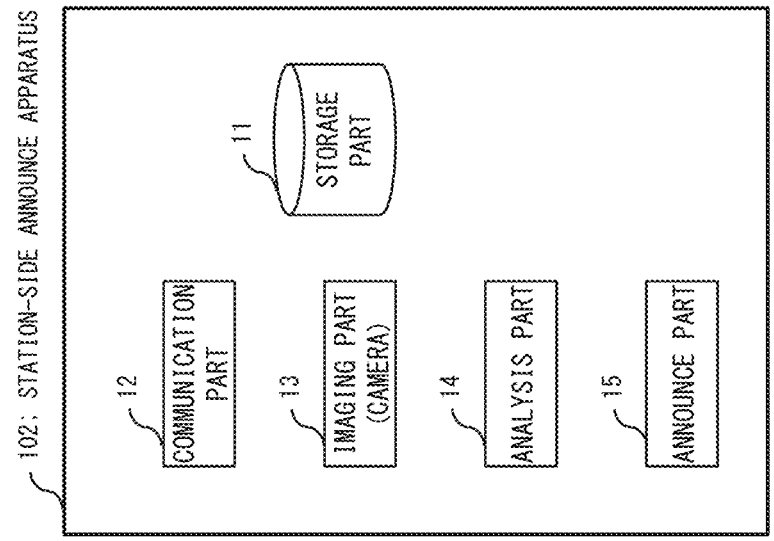
FIG. 5 is a block diagram showing an example of inner configuration of a station-side announce apparatus 102.

FIG. 5 is a block diagram showing an example of an inner configuration of the station-side announce apparatus (first announce apparatus) 102. The station-side announce apparatus 102 is configured by comprising a storage part 11, a communication part 12, an imaging part (camera) 13, an analysis part 14 (first analysis part), and an announce part 15 (first announce part).

The storage part 11 stores management information in which arrival/departure schedule, information for identifying the vehicle (hereinafter, referred to as "vehicle identification information"), and announce apparatus concordance information are associated. Herein, the announce apparatus concordance information refers to a pair [set] of information identifying the station-side announce apparatus 102 (hereinafter, referred to as "station-side apparatus identification information") and information identifying the vehicle-side announce apparatus 202 (hereinafter, referred to as "vehicle-side apparatus identification information").

The communication part 12 communicates with the vehicle-side announce apparatus 202 via a network. Concretely, during the vehicle travels and/or stops, the communication part 12 communicates with the vehicle-side announce apparatus 202 which registers thereto under a situation where the vehicle 200 stops at the station 100 and is assigned to the boarding position 101 and the vehicle door 201.

The imaging part (camera) 13 captures the boarding position 101 at the station 100. The imaging part (camera) 13 captures a movie image. Assume that, the imaging part (camera) 13 is arranged at a position where it may capture passenger-queue(s) of the passengers who wait for the vehicle 200 from the front end to the rearmost end.

The analysis part 14 obtains a capture image capturing an area including the boarding position 101 at the station, detects the support-needing user from the capture image based on his appearance feature, and determines, based on the capture image, whether or not the support-needing user intends to board on the vehicle.

Concretely, the analysis part 14 selects a determination target person from the capture image. In addition, the analysis part 14 determines an appearance feature of the determination target person based on the capture image. For example, the appearance feature may be a wheelchair, a crutch, a white cane, an old person, holding an infant, and the like. In addition, for example, the appearance feature may be an item indicating that the bearer is a pregnant woman (for example, a maternity mark). In addition, for example, the appearance feature may be an item notifying surrounding persons that the bearer needs support (for example, a help mark).

The analysis part 14 determines whether or not that the determination target person is the support-needing user based on the determined appearance feature. Further, when the analysis part 14 determines that the determination target person is the support-needing user, the analysis part 14 determines a property of the support-needing user based on the determined appearance feature.

For example, the analysis part 14 compares appearance features previously registered on the storage part 11 (teacher information) with the capture image so as to detect the support-needing user from the capture image based on his appearance feature. Herein, the analysis part 14 may utilize machine learning so as to generate [new] teacher information showing the appearance feature and then register it on the storage part 11. In addition, the analysis part 14 may utilize known image recognition technology and image discrimination technology so as to compare the previously registered teacher information (appearance feature) with the capture image to detect the support-needing user from the capture image. Herein, in the following explanation, a wheelchair user, a crutch user, a white cane user, an old person, a person who holds an infant, a pregnant woman, a person who notifies surrounding persons that he needs support are exemplified for explanation as the property of the support-needing user. However, they are examples of the property of the support-needing user, thus it is not intended to limit the property of the support-needing user. Assume that, the analysis part 14 may appropriately register required appearance feature as the appearance feature of the support-needing user (teacher information).

In addition, the analysis part 14 determines whether or not the support-needing user intends to board on the vehicle based on the position of the support-needing user. For example, the analysis part 14 may determine that the support-needing user intends to board on the vehicle in a case where the support-needing user is detected in an area within a predetermined range from the boarding position 101. On the other hand, the analysis part 14 may determine that the support-needing user does not intend to board on the vehicle in a case where the support-needing user is detected outside of the predetermined range from the boarding position 101.

The announce part 15 announces the boarding on/off support information relating to the support-needing user. The announce part 15 is configured by comprising an LCD panel, a loudspeaker, and the like.

The announce part 15 announces the boarding on/off support information relating to the support-needing user using at least one of capture image, illustration and animation. Concretely, the announce part 15 uses at least any one of the capture image, a static image, an illustration, an animation extracted from the capture image so as to announce the boarding on/off support information relating to the support-needing user.

It is preferable that the announce part 15 reduces visibility of a facial area included in the capture image in a case where the announce is performed using the capture image. For example, the announce part 15 may execute pixelization [i.e., conversion to mosaic image] onto the facial area included in the capture image. In addition, the announce part 15 may display the capture image subjected to the pixelization on the LCD panel.

In addition, in a case where the announce part 15 executes the announcement using the illustration or the animation, the storage part 11 previously stores the illustration or the animation indicating the property of the support-needing user. For example, the storage part 11 previously stores the illustration or the animation indicating the wheelchair user, the crutch user, the white cane user, the old person, the person who holds an infant, the pregnant woman, the person who notifies surrounding persons that he needs support (for example, a person who bears a help mark) and the like.

In addition, in a case where the announce part 15 executes the announce using the illustration or the animation, the announce part 15 may display, on the LCD panel, the illustration or the animation, which corresponds to the property of the support-needing user among the previously registered illustrations or animations.

In addition, the announce part 15 may announce the boarding on/off support information relating to the the support-needing user using voice. In such case, storage part 11 previously stores voice indicating that the support-needing user will board on/off the vehicle. For example, the storage part 11 may previously store the voice, such as "there is a passenger who uses a wheelchair at the station, thus please make cooperation when the passenger boards on the vehicle".

In addition, in a case where the announce part 15 executes the announcement using the voice, the announce part 15 may announce the voice corresponding to the detected property of the support-needing user among the previously registered voices using the loudspeaker. Herein, the announce part 15 may execute the announcement using the voice while announcing the boarding on/off support information relating to the support-needing user using at least any one of the capture image, the illustration and the animation.

The announce part 15 may announce the boarding on/off support information relating to the support-needing user until completion of boarding on/off by the support-needing user with a predetermined time period interval (for example, with one-minute interval). In addition, in a case where the analysis part 14 detects, based on the capture image, the support-needing user at the rearmost end of a queue of passengers who wait for the vehicle 200, the announce part 15 may announce the boarding on/off support information relating to the support-needing user until that the support-needing user comes the front side in the passenger-queue.

In addition, in a case where the communication part 12 receives the boarding on/off support information relating to the support-needing user from the vehicle-side announce apparatus 202, the announce part 15 announces the boarding on/off support information relating to the support-needing user using at least any one of the capture image, the illustration and the animation.

In addition, in a case where the analysis part 14 detects two or more support-needing users, the announce part 15 announces the boarding on/off support information relating to the support-needing users for each of the support-needing users.

The station-side announce apparatus 102 may previously determine the timing of announcing the boarding on/off support information relating to the support-needing user based on a predetermined condition. For example, the station-side announce apparatus 102 may previously determine the timing of announcing the boarding on/off support information relating to the support-needing user based on the position of the vehicle 200 (for example, the distance from the vehicle door 201 to the assigned boarding position 101). In addition, for example, the station-side announce apparatus 102 may previously determine the timing of announcing the boarding on/off support information relating to the support-needing user based on a time point (for example, 10 seconds before opening of the vehicle door 201).

Next, the vehicle-side announce apparatus 202 is explained in detail. Herein, in the following explanation, a configuration is exemplified for explanation where the vehicle-side announce apparatus 202 comprises the camera. However, it is not intended to limit the configuration of the vehicle-side announce apparatus 202 to that comprising the camera.

Figure 6:
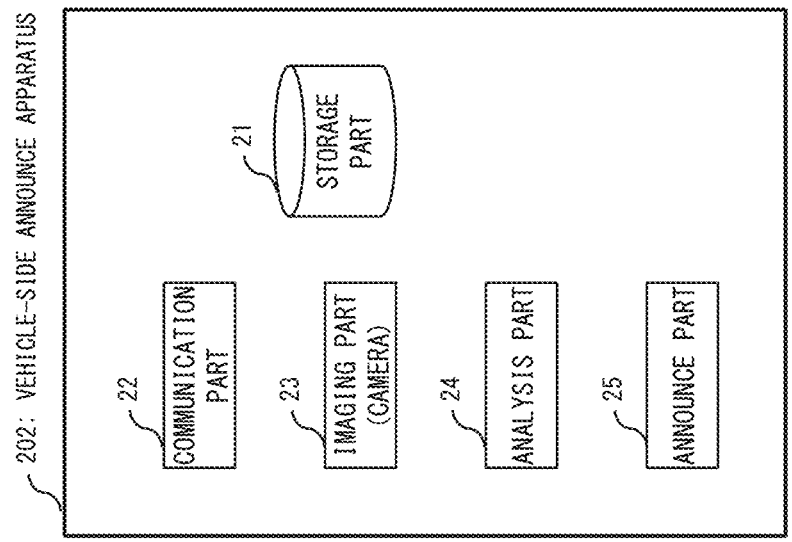
FIG. 6 is a block diagram showing an example of inner configuration of a vehicle-side announce apparatus 202.

FIG. 6 is a block diagram showing an example of an inner configuration of the vehicle-side announce apparatus (second announce apparatus) 202. The vehicle-side announce apparatus 202 is configured by comprising a storage part 21, a communication part 22, an imaging part (camera) 23, an analysis part 24 (second analysis part), and an announce part 25 (second announce part).

The storage part 21 stores the management information in which the arrival/departure schedule, the information for identifying the vehicle (vehicle identification information), the announce apparatus concordance information are associated.

The communication part 22 communicates with the station-side announce apparatus 102 via the network. Concretely, during the vehicle travels and/or stops, the communication part 22 communicates with the station-side announce apparatus 102 which registers thereto under a situation where the vehicle 200 stops at the station 100 and is assigned to the boarding position 101 and the vehicle door 201.

The imaging part (camera) 23 captures images of inside of the vehicle 200. The imaging part (camera) 23 captures movie images. Assume that, the imaging part (camera) 23 is arranged at a position where it may shoot images of an area within a predetermined range from the vehicle door 201. For example, the imaging part (camera) 23 may be arranged near a section above the vehicle door 201.

The analysis part 24 obtains the capture image capturing inside of the vehicle 200 so as to detect the support-needing user from the capture image based on his appearance feature. In addition, the analysis part 24 determines, based on the capture image, whether or not the support-needing user intends to board off the vehicle. Detail explanation for a method to detect the support-needing user by the analysis part 24 is omitted, since it is similar to that of the analysis part 14 in the station-side announce apparatus 102.

The analysis part 24 determines behaviors of the support-needing user based on the capture image. In addition, the analysis part 24 determines whether the support-needing user will board off the vehicle based on the behaviors of the support-needing user.

Concretely, the analysis part 24 determines whether or not the support-needing user made a pre-boarding off previously registered (such as, action (behavior) standing up, changing direction of his body, tidying up his items, preparation, and the like). In a case where the support-needing user made the pre-boarding off action previously registered, the analysis part 24 determines that the support-needing user will board off the vehicle at the next station. For example, the storage part 21 may previously store a feature value indicating the pre-boarding off action, which has been generated using machine learning. In addition, the analysis part 24 may determine that the support-needing user will board off the vehicle at the next station in a case where the feature value indicating the pre-boarding off action stored in the storage part 21 is detected from the capture image. On the other hand, the analysis part 24 may determine that the support-needing user will not board off the vehicle at the next station in a case where the feature value indicating the pre-boarding off action stored in the storage part 21 is not detected from the capture image.

The announce part 25 announces the boarding on/off support information relating to the support-needing user. The announce part 25 is configured by comprising the LCD panel, the loudspeaker, and the like.

Concretely, the announce part 25 announces the boarding on/off support information relating to the support-needing user using at least one of the capture image, the illustration and the animation. More concretely, the announce part 25 uses at least any one of the capture image, a static image, an illustration, an animation extracted from the capture image so as to announce the boarding on/off support information relating to the support-needing user.

It is preferable that the announce part 25 reduces visibility of a facial area included in the capture image in a case where the announce is performed using the capture image. For example, the announce part 25 may execute pixelization [i.e., conversion to mosaic image] to the facial area included in the capture image. In addition, the announce part 25 may display the capture image subjected to the pixelization on the LCD panel.

In addition, in a case where the announce part 25 executes the announces using the illustration or the animation, the storage part 21 previously stores the illustration or the animation indicating the property of the support-needing user. For example, the storage part 21 previously stores the illustration or the animation indicating the wheelchair user, the crutch user, the white cane user, the old person, the person who holds an infant, the pregnant woman, the person who notifies surrounding persons that he needs support (for example, a person who bears a help mark) and the like.

In addition, in a case where the announce part 25 executes the announce using the illustration or the animation, the announce part 25 may display the illustration or the animation on the LCD panel, which corresponds to the property of the support-needing user among the previously registered illustrations or animations.

In addition, the announce part 25 may announce the boarding on/off support information relating to the support-needing user using voice. In such case, the storage part 21 previously stores voice indicating that the support-needing user will board on/off the vehicle. For example, the storage part 11 may previously store the voice, such as "a wheelchair user will board on the vehicle at the next station".

In addition, in a case where the announce part 25 executes the announce using the voice, the announce part 25 may announce the voice corresponding to the detected property of the support-needing user among the previously registered voices using the loudspeaker. Herein, the announce part 25 may execute the announce using the voice while announcing the boarding on/off support information relating to the support-needing user using at least any one of the capture image, the illustration, and the animation.

The announce part 25 may announce the boarding on/off support information relating to the support-needing user until completion of boarding on/off by the support-needing user with a predetermined time period interval (for example, with one-minute interval). In addition, in a case where the analysis part 24 determines that the support-needing user will board off the vehicle based on the support-needing user's behaviors, the announce part 25 may announce the boarding on/off support information relating to the support-needing user until the support-needing user comes in front of the vehicle door 201.

In addition, in a case where the communication part 22 receives the boarding on/off support information relating to the support-needing user from the station-side announce apparatus 102, the announce part 25 announces the boarding on/off support information relating to the support-needing user using at least any one of the capture image, the illustration and the animation.

In addition, in a case where the analysis part 24 detects two or more support-needing users, the announce part 25 announces the boarding on/off support information relating to the support-needing users for each of the support-needing users.

The vehicle-side announce apparatus 202 may previously determine the timing of announcing the boarding on/off support information relating to the support-needing user based on a predetermined condition. For example, the vehicle-side announce apparatus 202 may previously determine the timing of announcing the boarding on/off support information relating to the support-needing user based on the position of the vehicle 200 (for example, the distance from the vehicle door 201 to the assigned boarding position 101). In addition, for example, the vehicle-side announce apparatus 202 may previously determine the timing of announcing the boarding on/off support information relating to the support-needing user based on a time point (for example, 10 seconds before opening of the vehicle door 201).

FIG. 7 is a diagram showing an example of the management information stored in the storage part 11 and the storage part 21. The management information illustrated in FIG. 7 is information in which "station", "destination", "arrival/departure schedule", "vehicle type", "train formation (number of vehicles)" and the "announce apparatus concordance information" are associated. Herein, as stated above, the announce apparatus concordance information is the pair [set] of the station-side apparatus identification information and the vehicle-side apparatus identification information. For example, when a train stops at "X station" at the arrival/departure time point "12:00", which is train type "AA01", comprises 4 vehicles, is destinated to "P station", the station-side announce apparatus 102 identified by the station-side apparatus identification information "1-A" registers to (is confronted with) the vehicle-side announce apparatus 202 identified by the vehicle-side apparatus identification information "1-a". In addition, for example, when a train stops at "X station" at the arrival/departure time point "12:05", which is train type "AA01", comprises 4 vehicles, is destinated to "Q station", the station-side announce apparatus 102 identified by the station-side apparatus identification information "4-F" registers to (is confronted with) the vehicle-side announce apparatus 202 identified by the vehicle-side apparatus identification information "4-f".

Figure 8:
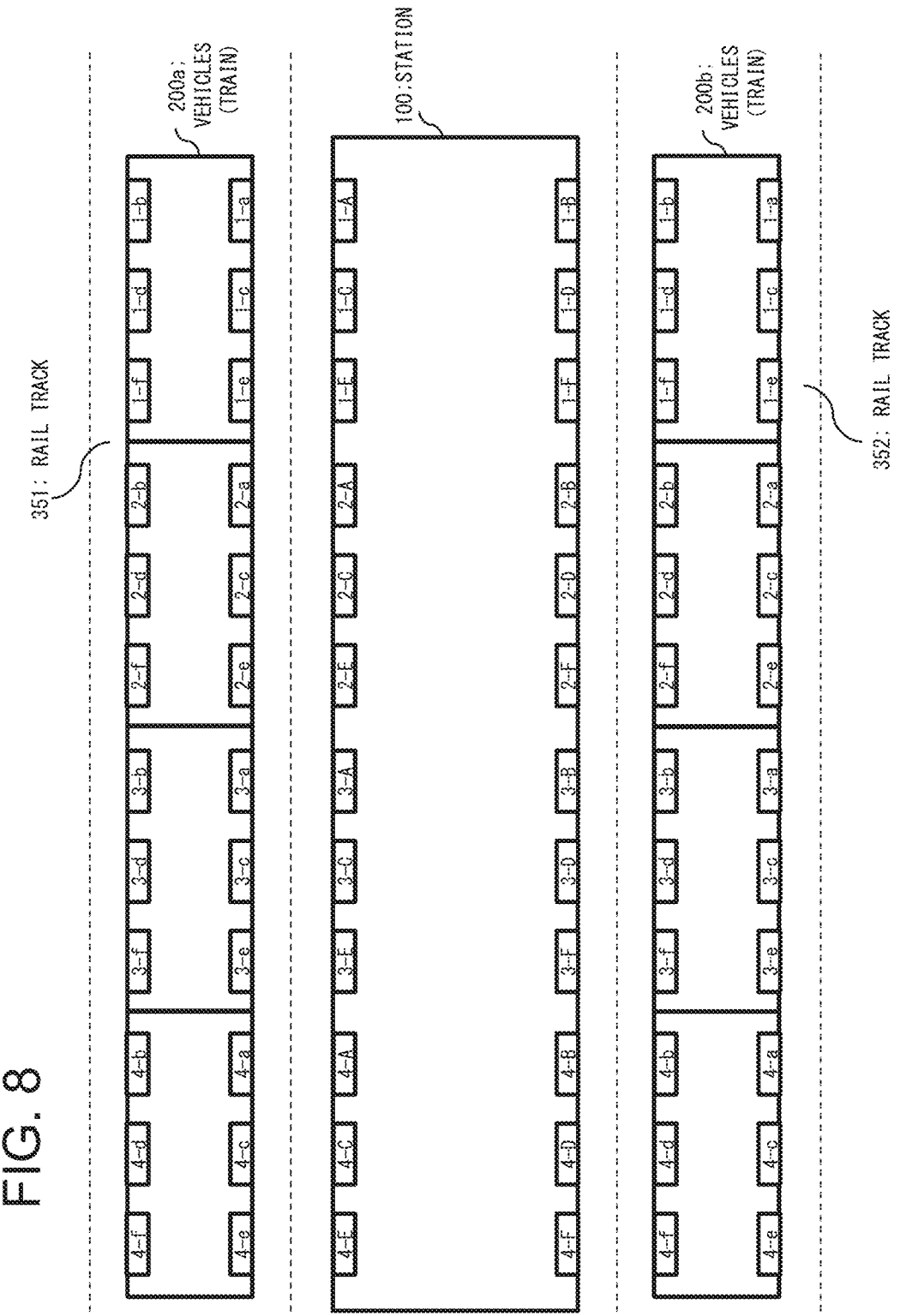
FIG. 8 is a schematic diagram showing relationship between the station-side announce apparatus 102 and the vehicle-side announce apparatus 202.

FIG. 8 is a schematic diagram indicating a relationship between the station-side announce apparatus 102 and the vehicle-side announce apparatus 202, which corresponds to the announce apparatus concordance information illustrated in FIG. 7. Assume that, in FIG. 8, numerals and letters written in rectangular squares for the station 100 respectively indicate the station-side apparatus identification information. In addition, assume that in FIG. 8, numerals and letters written in rectangular squares for vehicles (trains) 200a, 200b respectively indicate the vehicle-side apparatus identification information. For example, in a case where the vehicles (train) 200a enter a rail track 351, when the vehicles (train) 200a stop, the station-side announce apparatus 102 identified by the station-side apparatus identification information "1-A" registers to the vehicle-side announce apparatus 202 identified by the vehicle-side apparatus identification information "1-a". Therefore, in such case where the vehicles (train) 200a enter the rail track 351, communication is executed between the station-side announce apparatus 102 identified by the station-side apparatus identification information "1-A" and the vehicle-side announce apparatus 202 identified by the vehicle-side apparatus identification information "1-a" during the train travels and/or stops. In addition, for example, in a case where vehicles (train) 200b enter the rail track 352 and stop, when the vehicles (train) 200b stop, the station-side announce apparatus 102 identified by the station-side apparatus identification information "1-B" registers to the vehicle-side announce apparatus 202 identified by the vehicle-side apparatus identification information "1-b". Therefore, in such case where the vehicles (train) 200b enter the rail track 352, communication is executed between the station-side announce apparatus 102 identified by the station-side apparatus identification information "1-B" and the vehicle-side announce apparatus 202 identified by the vehicle-side apparatus identification information "1-b" during the train travels and/or stops.

Next, actions in the announce system of the present example embodiment is explained in detail.

Figure 9:
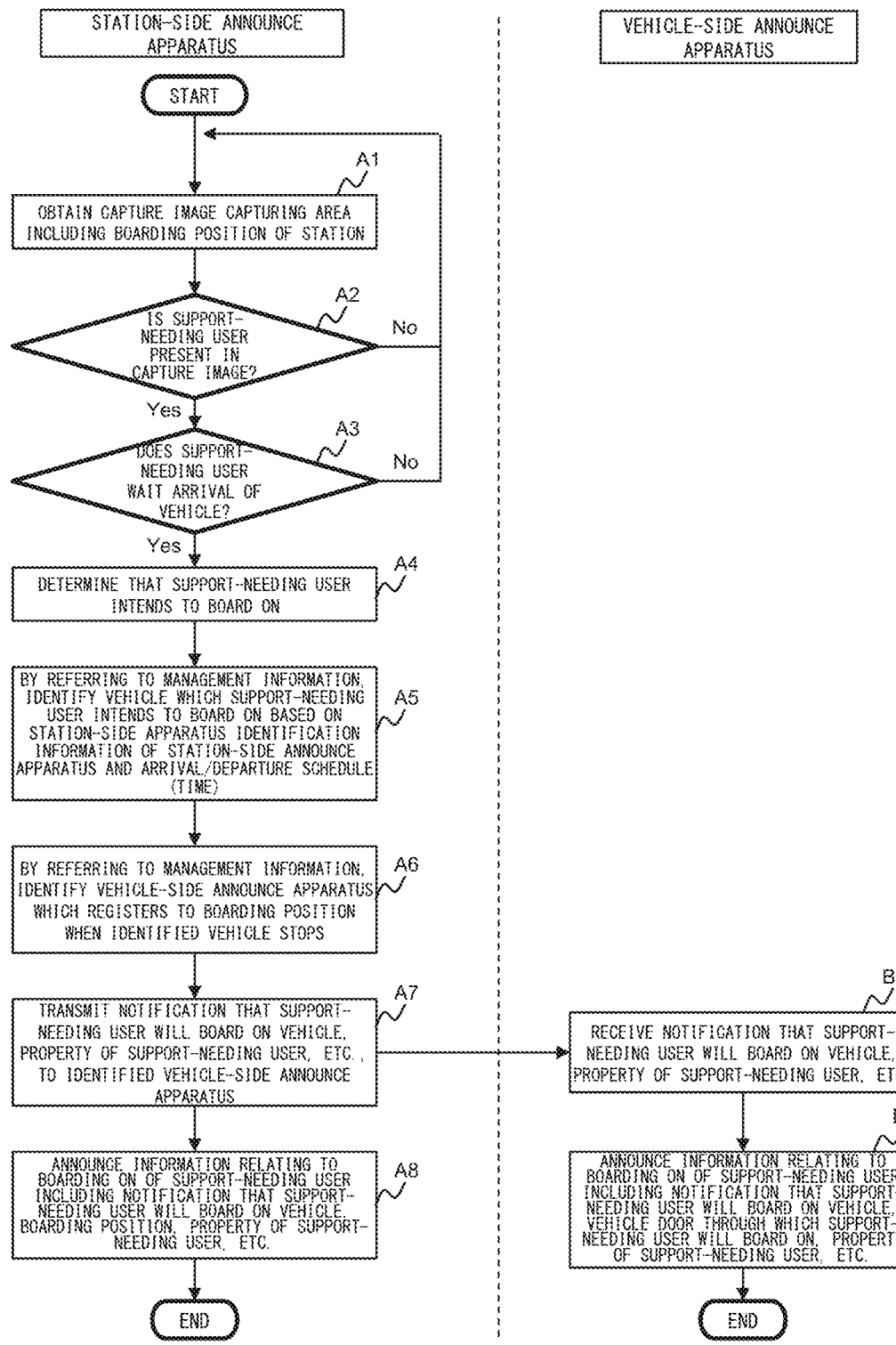
FIG. 9 is a flowchart showing an example of operations by the announce system of the first example embodiment.

First, while referring to FIG. 9, explained are processes where the boarding on/off support information relating to the support-needing user is announced when the support-needing user boards on the vehicle.

In step A1, the analysis part 14 of the station-side announce apparatus 102 obtains the capture image capturing the area including the boarding position 101 of the station 100.

In step A2, the analysis part 14 of the station-side announce apparatus 102 determines whether or not the support-needing user is present in the capture image. In a case where the support-needing user is absent in the capture image (branching to No in step A2), the station-side announce apparatus 102 returns to step A1 and continues the processes. In other words, in such case where the support-needing user is absent in the capture image (branching to No in step A2), the station-side announce apparatus 102 continues the process of monitoring the area including the boarding position 101 of the station 100.

On the other hand, in a case where the support-needing user is present in the capture image (branching to Yes in step A2), the analysis part 14 of the station-side announce apparatus 102 determines whether or not the support-needing user waits arrival of the vehicle (step A3). Concretely, the analysis part 14 of the station-side announce apparatus 102 determines whether the support-needing user waits arrival of the vehicle 200 based on the position of the support-needing user. For example, in a case where the support-needing user is present in the area within the predetermined range from the boarding position 101, the analysis part 14 of the station-side announce apparatus 102 determines that the support-needing user waits arrival of the vehicle 200.

In a case where the support-needing user does not intend to board on the vehicle (branching to No in step A3), the station-side announce apparatus 102 returns to step A1 and continues the processes. In other words, in such case where the support-needing user does not intend to board on the vehicle (branching to No in step A3), the station-side announce apparatus 102 continues monitoring the area including the boarding position 101 of the station 100.

On the other hand, in a case where the support-needing user waits arrival of the vehicle (branching to Yes in step A3), the analysis part 14 of the station-side announce apparatus 102 determines that the support-needing user intends to board on the vehicle (step A4).

In step A5, the analysis part 14 of the station-side announce apparatus 102 refers to the management information and identifies the vehicle 200 which the support-needing user intend to board on based on the station-side apparatus identification information identifying the station-side announce apparatus 102 and the arrival/departure schedule (time).

In step A6, the analysis part 14 of the station-side announce apparatus 102 refers to the management information and identifies the vehicle-side announce apparatus 202 which registers to the boarding position 101 when the identified vehicle 200 stops.

In step A7, the analysis part 14 of the station-side announce apparatus 102 transmits a notification that the support-needing user will board on the vehicle, the property of the support-needing user, and the like to the identified vehicle-side announce apparatus 202 via the communication part 12. The vehicle-side announce apparatus 202 receives the notification that the support-needing user will board on the vehicle, the property of the support-needing user, and the like (step B1).

The announce part 15 of the station-side announce apparatus 102 announces the boarding on/off support information relating to the support-needing user including the notification that the support-needing user will board on the vehicle, the boarding position 101 of the support-needing user, the property of the support-needing user, and the like (step A8). In addition, the announce part 25 of the vehicle-side announce apparatus 202 announces the boarding on/off support information relating to the support-needing user including the notification that the support-needing user will board on the vehicle, the vehicle door 201 through which the support-needing user will board on the vehicle, the property of the support-needing user, and the like (step B2). Herein, the announce part 25 of the vehicle-side announce apparatus 202 announces the vehicle door 201 assigned to the vehicle-side announce apparatus 202 which registers to the boarding position 101 of the support-needing user as the vehicle door 201 through which the support-needing user will board on the vehicle.

Figure 10:
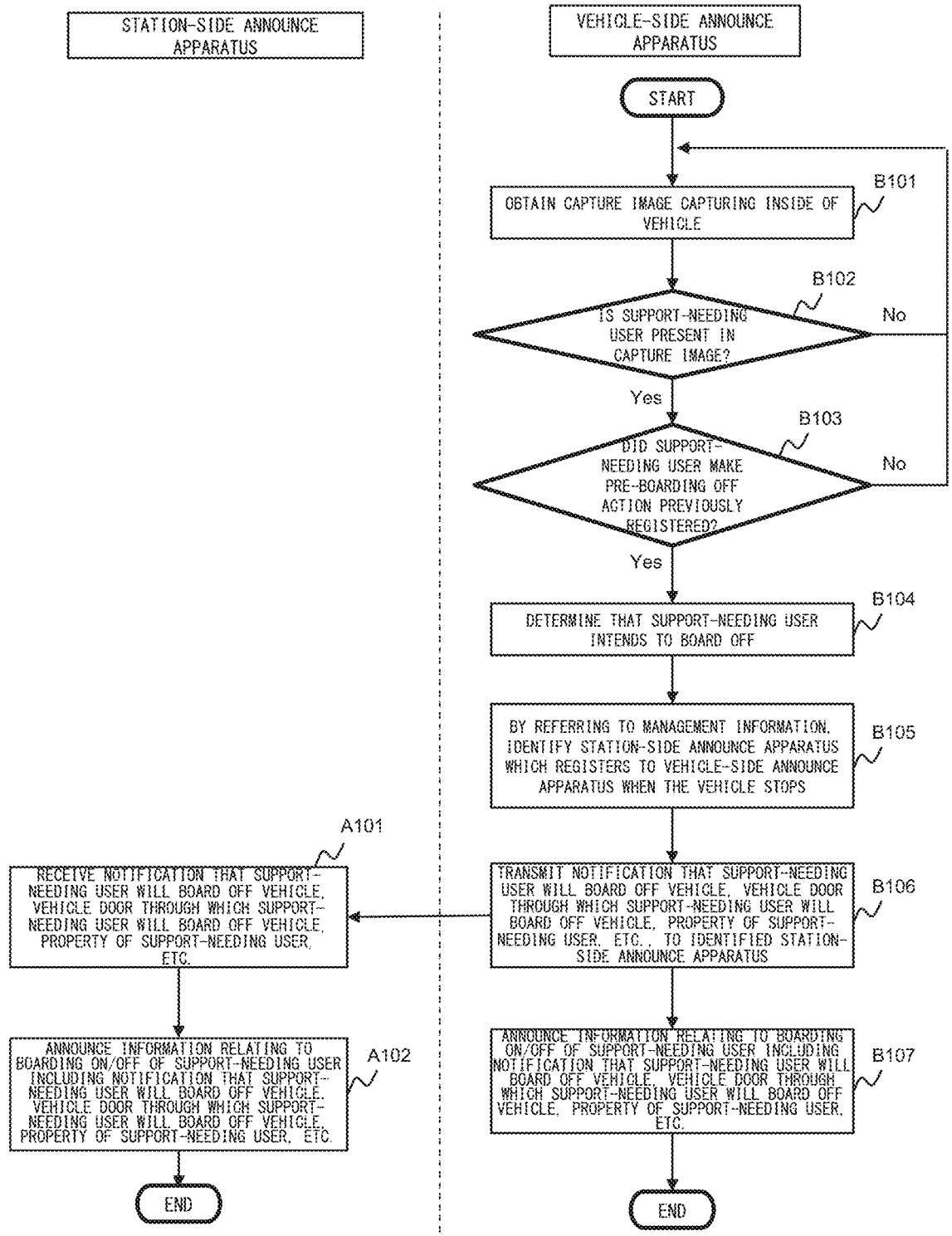
FIG. 10 is a flowchart showing an example of operations by the announce system of the first example embodiment.

Next, while referring to FIG. 10, explained are processes where the boarding on/off support information relating to the support-needing user is announced when the support-needing user boards off the vehicle.

In step B101, the analysis part 24 of the vehicle-side announce apparatus 202 obtains a capture image capturing inside of the vehicle 200.

In step B102, the analysis part 24 of the vehicle-side announce apparatus 202 determines whether or not the support-needing user is present in the capture image. In a case where the support-needing user is absent in the capture image (branching to No in step B102), the vehicle-side announce apparatus 202 returns to step B101 and continues the processes. In other words, in such case where the support-needing user is absent in the capture image (branching to No in step B102), the vehicle-side announce apparatus 202 continues the process of monitoring inside of the vehicle 200.

On the other hand, in a case where the support-needing user is present in the capture image (branching to Yes in step B102), the analysis part 24 of the vehicle-side announce apparatus 202 determines whether or not the support-needing user made the pre-boarding off action (behavior) previously registered (step B103). Herein, the analysis part 24 of the vehicle-side announce apparatus 202 may determine whether or not the support-needing user made the pre-boarding off action previously registered based on the capture image capturing inside of the vehicle 200 for predetermined time period (movie image capturing inside of the vehicle 200).

In a case where the support-needing user did not make the pre-boarding off action previously registered (branching to No in step B103), the vehicle-side announce apparatus 202 returns to step B101 and continues the processes. In other words, in such case where the support-needing user did not make the pre-boarding off action previously registered (branching to No in step B103), the vehicle-side announce apparatus 202 continues the process of monitoring inside of the vehicle 200.

On the other hand, in a case where the support-needing user made the pre-boarding off action previously registered (branching to Yes in step B103), the analysis part 24 of the vehicle-side announce apparatus 202 determines that the support-needing user intends to board off the vehicle (step B104).

In step B105, the analysis part 24 or the vehicle-side announce apparatus 202 refers to the management information and identifies the station-side announce apparatus 102 which registers to the vehicle-side announce apparatus 202 when the vehicle 200 stops.

In step B106, the analysis part 24 of the vehicle-side announce apparatus 202 transmits the notification that the support-needing user will board off the vehicle, the vehicle door 201 through which the support-needing user will board off the vehicle, the property of the support-needing user, and the like to the identified station-side announce apparatus 102 via the communication part 22. Herein, the analysis part 24 of the vehicle-side announce apparatus 202 transmits the vehicle door 201 assigned to the vehicle-side announce apparatus 202 as the vehicle door 201 through which the support-needing user will board off the vehicle to the identified station-side announce apparatus 102. The station-side announce apparatus 102 receives the notification that the support-needing user will board off the vehicle, the vehicle door 201 through which the support-needing user will board off the vehicle, the property of the support-needing user, and the like (step A101).

The announce part 25 of the vehicle-side announce apparatus 202 announces the boarding on/off support information relating to the support-needing user including the notification that the support-needing user will board off the vehicle, the vehicle door 201 through which the support-needing user will board off the vehicle, the property of the support-needing user, and the like (step B107). In addition, the announce part 15 of the station-side announce apparatus 102 announces the boarding on/off support information relating to the support-needing user including the notification that the support-needing user will board off the vehicle, the vehicle door 201 through which the support-needing user will board off the vehicle, the property of the support-needing user, and the like (step A102).

As described above, in the announce system of the present example embodiment, the vehicle-side announce apparatus 202 announces the boarding on/off support information relating to the support-needing user. Thereby, the announce system of the present example embodiment contributes to increase the possibility that the support-needing user is easily provided with support by the passengers in the vehicle 200 (particularly, passengers near the vehicle door 201a) when he boards on the vehicle.

In addition, in the announce system of the present example embodiment, the vehicle-side announce apparatus 202 announces the boarding on/off support information relating to the support-needing user. Thereby, the announce system of the present example embodiment contributes to increase the possibility that the support-needing user is easily provided with support by the passengers in the vehicle 200 when he boards off the vehicle.

In addition, in the announce system of the present example embodiment, the station-side announce apparatus 102 announces the boarding on/off support information relating to the support-needing user. Thereby, the announce system of the present example embodiment contributes to increase the possibility that the support-needing user is easily provided with support by the passengers at the station 100 (particularly, passengers near the boarding position 101) when he boards off the vehicle.

That is, the announce system of the present example embodiment contributes to increase the possibility that the support-needing user is easily provided with support when he uses a public transport by virtue that the station-side announce apparatus 102 announces the boarding on/off support information relating to support-needing user.

Variant Example Embodiment 1

Figure 11:
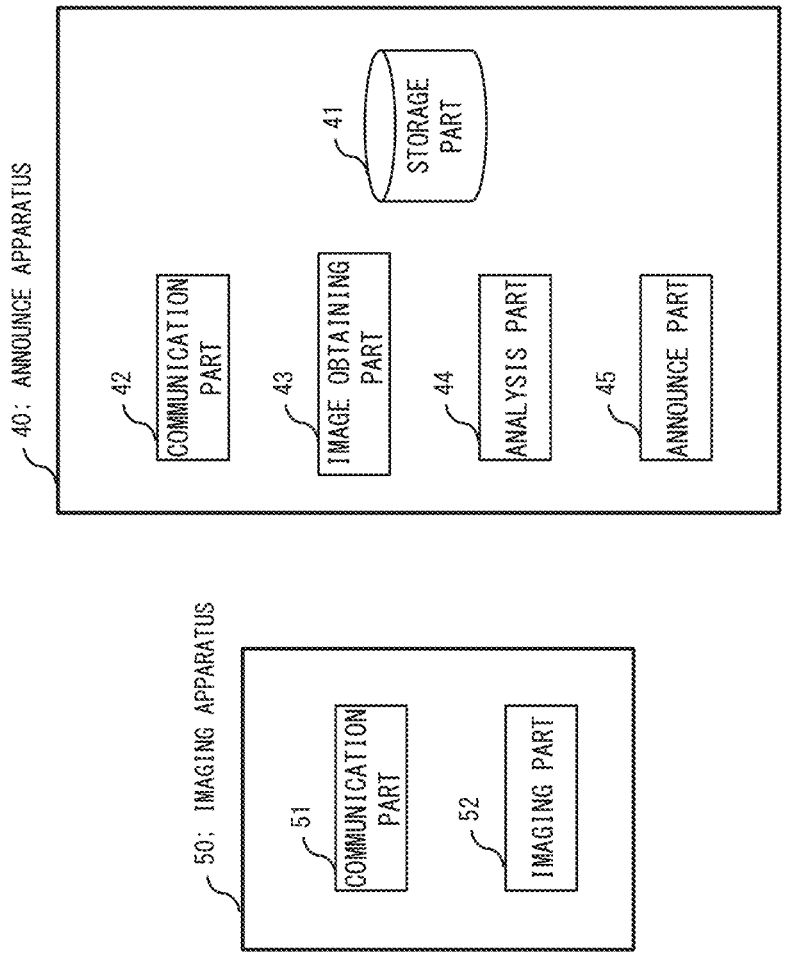
FIG. 11 is a block diagram showing an example of inner configurations of an announce apparatus 40 and an imaging apparatus 50.

As a variant example embodiment 1 of the present example embodiment, the announce apparatus and the imaging apparatus may be different apparatuses. FIG. 11 is a block diagram showing an example of inner configuration of an announce apparatus 40 and an imaging apparatus 50 in the variant example embodiment 1 of the present example embodiment. The announce apparatus 40 is configured by comprising a storage part 41, a communication part 42, an image obtaining part 43, an analysis part 44, and an announce part 45. The imaging apparatus 50 is configured by comprising a communication part 51 and an imaging part 52.

In a case where the announce apparatus 40 is arranged at the station 100, assume that the imaging apparatus 50 is arranged at a position where it may capture passenger-queues of the passengers who wait for the vehicle at the station 100 from the front end to the rearmost end. In addition, in a case where the announce apparatus 40 is arranged on the station 100, the imaging part 52 generates capture images capturing an area including a boarding position. In such case, the communication part 51 transmits the capture image(s) to the announce apparatus 40 arranged on the station 100 via a network.

In a case where the announce apparatus 40 is arranged on the station 100, the communication part 42 is connected, via a network, to the imaging apparatus 50 capturing the area including the boarding position. In a case where the announce apparatus 40 is arranged on the station 100, the image obtaining part 43 receives the capture image (s) capturing the area including the boarding position from the imaging apparatus 50 via the communication part 42.

In a case where the announce apparatus 40 is arranged on the station 100, the analysis part 44 and the announce part 45 are the same as the analysis part 14 and the announce part 15 described above, thus their detail explanation is omitted.

In a case where the announce apparatus 40 is arranged in the vehicle 200, assume that, the imaging apparatus 50 is arranged at a position where it may capture the area within a predetermined range from the vehicle door 201. For example, the imaging apparatus 50 may be arranged near a section above the vehicle door 201. In addition, in a case where the announce apparatus 40 is arranged in the vehicle 200, the imaging part 52 generates the capture image capturing inside of the vehicle 200. In such case, the communication part 51 transmits the capture image to the announce apparatus 40 arranged in the vehicle 200 via the network.

In a case where the announce apparatus 40 is arranged in the vehicle 200, the communication part 42 is connected to the imaging apparatus 50 capturing inside of the vehicle 200 via the network. In a case where the announce apparatus 40 is arranged in the vehicle 200, the image obtaining part 43 receives the capture image capturing inside of the vehicle 200 from the imaging apparatus 50 via the communication part 42.

In a case where the announce apparatus 40 is arranged in the vehicle 200, the analysis part 44 and the announce part 45 are the same as the analysis part 24 and announce part 25 described above, thus their detail explanation is omitted.

Second Example Embodiment

The present example embodiment is an embodiment where the vehicle-side announce apparatus determines crowd state in the vehicle and notifies the station-side announce apparatus. Herein, in the explanation of the present example embodiment, explanations of overlapping portions to the above example embodiment are omitted. Further, in the explanation of the present example embodiment, the same reference numerals are appended to the same components as those in the above example embodiment, and their explanations are omitted. In addition, in the explanation of the present example embodiment, explanations of the same actions and effects as those in the above example embodiment are also omitted. The same is applied to other example embodiments.

The entire configuration of the announce system of the present example embodiment is same as that illustrated in FIG. 2. In the following explanation, differences from the announce system of the above example embodiment are explained in detail.

First, the station-side announce apparatus 102 of the present example embodiment is explained in detail.

Inner configuration of the station-side announce apparatus 102 of the present example embodiment is same as illustrated in FIG. 5. In the following explanation, differences from the station-side announce apparatus 102 of the first example embodiment are explained in detail.

In a case where the analysis part 14 of the present example embodiment detects the support-needing user, the communication part 12 of the present example embodiment communicates with the vehicle-side announce apparatus 202 which registers to the boarding position 101 of the support-needing user when the vehicle 200 stops so as to request the vehicle-side announce apparatus 202 to provide the information relating to the pertinency (non-pertinency) to boarding.

When the communication part 12 of the present example embodiment receives the information relating to the pertinency to boarding from the vehicle-side announce apparatus 202, the announce part 15 of the present example embodiment announces the pertinency to boarding according to the information relating to the pertinency to boarding.

Concretely, in a case where the communication part 12 received the information indicating that the boarding position 101 of the support-needing user is pertinent to boarding from the vehicle-side announce apparatus 202, the announce part 15 announces that the support-needing user should board on the vehicle from the boarding position 101 at which the support-needing user waits arrival of the vehicle. On the other hand, in a case where the communication part 12 received information indicating that the boarding position 101 of the support-needing user is not pertinent to boarding from the vehicle-side announce apparatus 202, the announce part 15 provides notification (display, announce) that the support-needing user should board on the vehicle from a different boarding position 101.

Next, the vehicle-side announce apparatus 202 of the present example embodiment is explained in detail.

Inner configuration of the vehicle-side announce apparatus 202 of the present example embodiment is as illustrated in FIG. 6. In the following explanation, differences from the vehicle-side announce apparatus 202 of the first example embodiment are explained in detail.

When the communication part 22 of the present example embodiment receives the request for information relating to the pertinency to boarding from the station-side announce apparatus 102, the analysis part 24 of the present example embodiment presumes a crowd state in the vehicle 200 based on the capture image obtained by the imaging part (camera) 23. In addition, the analysis part 24 determines the pertinency to boarding based on the crowd state, and notifies the station-side announce apparatus 102 of the information relating to the pertinency to boarding via the communication part 22.

Concretely, the analysis part 24 detects (extracts) a person from the capture image. Although there are various methods of detecting a person from the capture image, they may be adopted irrespective of their detail schemes.

In a case where the number of the persons appearing in the capture image exceeds a predetermined number, the analysis part 24 determines that the vehicle door 201 assigned to the vehicle-side announce apparatus 202 is not pertinent to boarding. In such case, the analysis part 24 notifies the station-side announce apparatus 102 of the information indicating that the vehicle door 201 is not pertinent to boarding as the information relating to the pertinency to boarding via the communication part 22.

On the other hand, in a case where the number of persons appearing in the capture image is the predetermined number or less, the analysis part 24 determines that the vehicle door 201 assigned to the vehicle-side announce apparatus 202 is pertinent to boarding. In such case, the analysis part 24 notifies the station-side announce apparatus 102 of the information indicating that the vehicle door 201 is pertinent to boarding as the information relating to the pertinency to boarding via the communication part 22.

Figure 12:
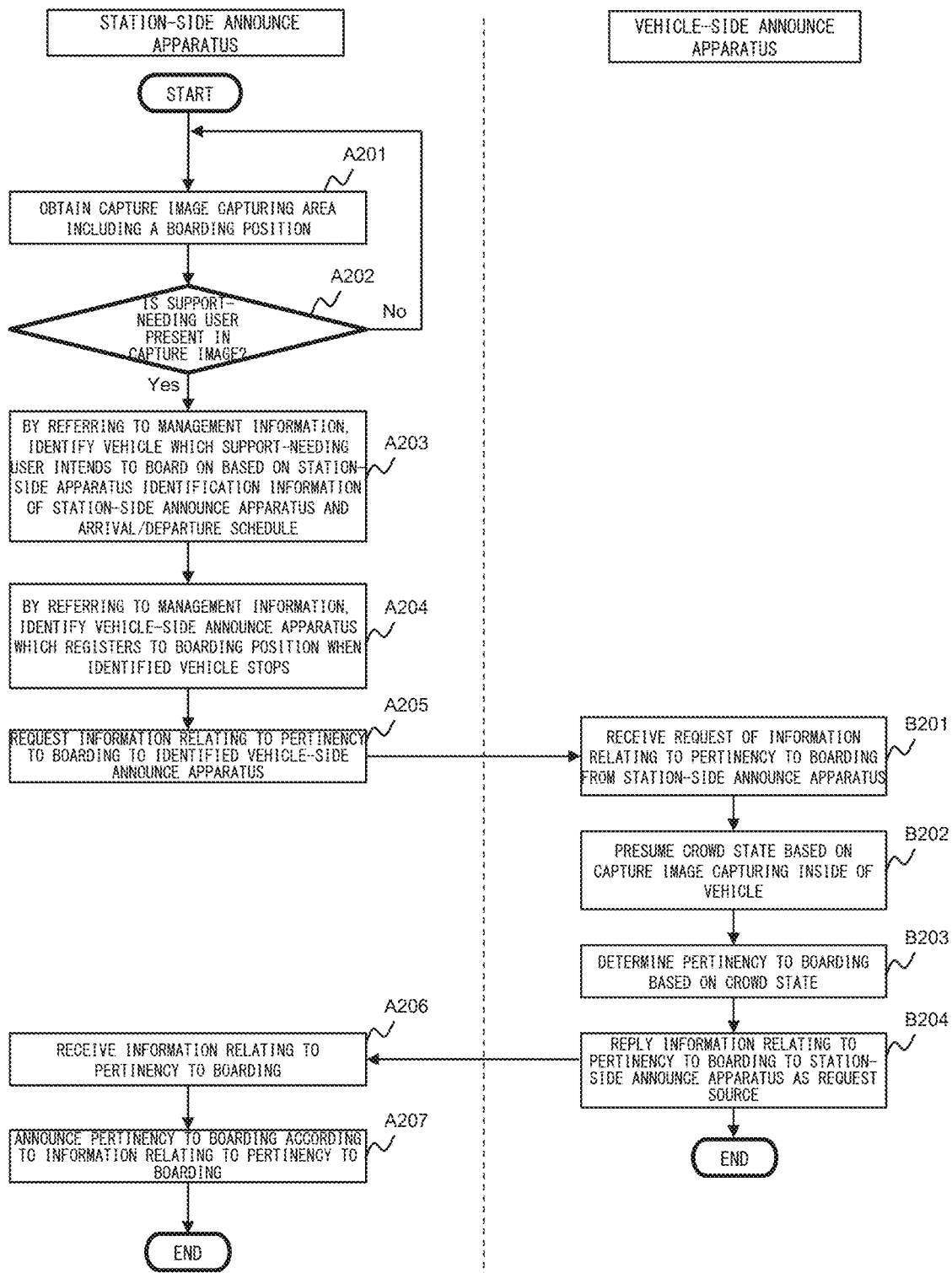
FIG. 12 is a flowchart showing an example of operations by an announce system of a second example embodiment.

Next, while referring to FIG. 12, operations by the announce system of the present example embodiment are explained in detail.

In step A201, the analysis part 14 of the station-side announce apparatus 102 obtains the capture image capturing the area including a boarding position.

In step A202, the analysis part 14 of the station-side announce apparatus 102 determines whether or not the support-needing user is present in the capture image. In a case where the support-needing user is absent in the capture image (branching to No in step A202), the station-side announce apparatus 102 returns to step A201, and continues the processes. In other words, in such case where the support-needing user is absent in the capture image (branching to No in step A202), the station-side announce apparatus 102 continues the process of monitoring the area including the boarding position 101 at the station. On the other hand, in a case where the support-needing user is present in the capture image (branching to Yes in step A202), the station-side announce apparatus 102 shifts to step A203.

In step A203, the analysis part 14 of the station-side announce apparatus 102 refers to the management information and identifies the vehicle 200 which the support-needing user intends to board on based on the station-side apparatus identification information of the station-side announce apparatus 102 and the arrival/departure schedule.

In step A204, the analysis part 14 of the station-side announce apparatus 102 refers to the management information and identifies the vehicle-side announce apparatus 202 which registers to the boarding position 101 when the identified vehicle 200 stops.

In step A205, the analysis part 14 of the station-side announce apparatus 102 requests the information relating to the pertinency to boarding to the identified vehicle-side announce apparatus 202 via the communication part 12. The vehicle-side announce apparatus 202 receives the request of the information relating to the pertinency to boarding from the station-side announce apparatus 102 (step B201).

In step B202, the analysis part 24 of the vehicle-side announce apparatus 202 presumes the crowd state based on the capture image capturing inside of the vehicle 200.

In step B203, the analysis part 24 of the vehicle-side announce apparatus 202 determines pertinency to boarding based on the crowd state.

In step B204, the analysis part 24 of the vehicle-side announce apparatus 202 replies the information relating to the pertinency to boarding to the station-side announce apparatus 102 as the request source. The station-side announce apparatus 102 receives the information relating to the pertinency to boarding (step A206).

In step A207, the announce part 15 of the station-side announce apparatus 102 announces the pertinency to boarding according to the information relating to the pertinency to boarding.

Figure 13:
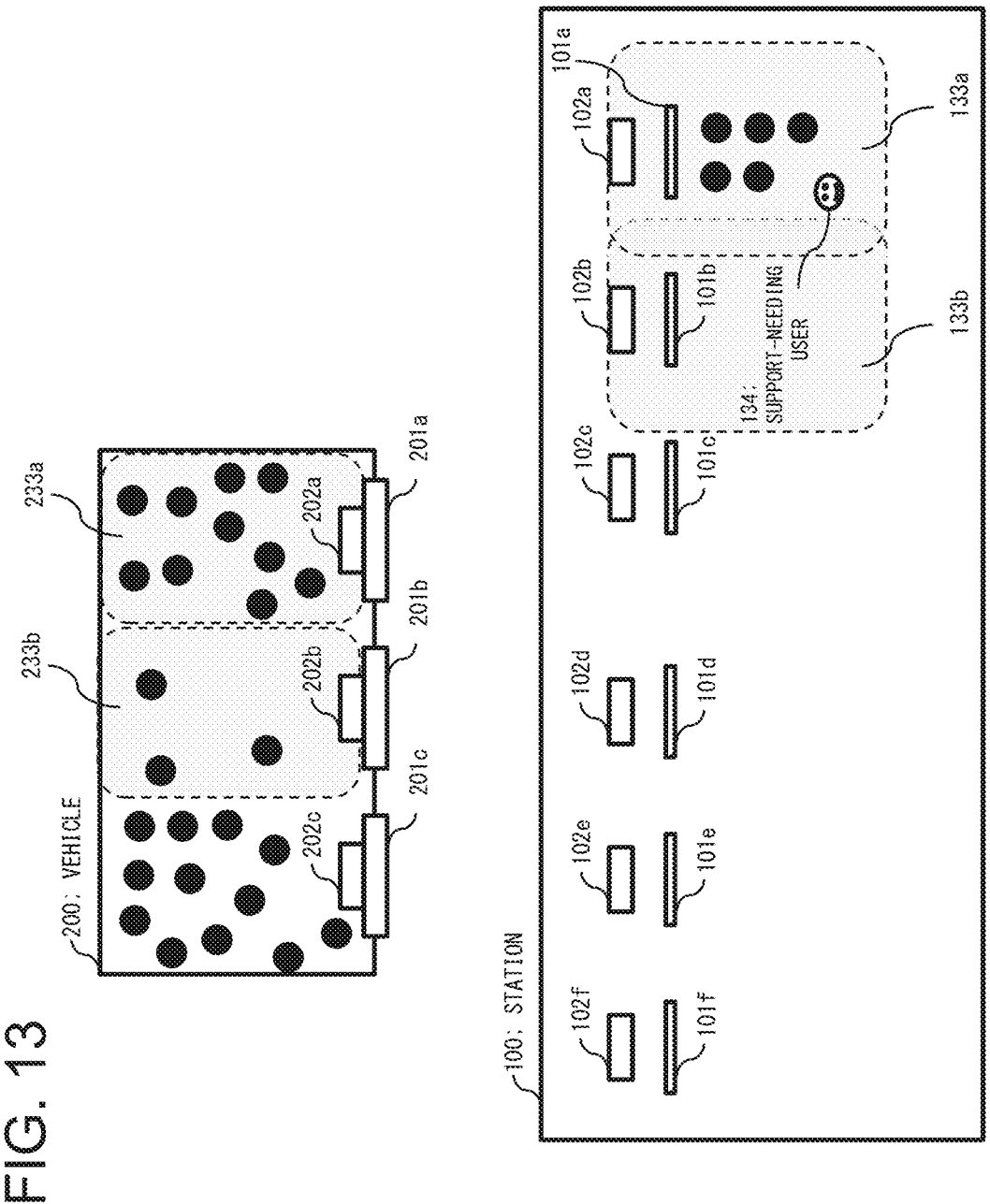
FIG. 13 is a diagram showing an example of a situation where each of vehicle doors 201 have different crowd state near the vehicle doors 201.

FIG. 13 is a diagram showing an example of a situation where each of the vehicle doors 201 has a different crowd state near the vehicle doors 201. Assume that, black circles "." illustrated in FIG. 13 indicate passengers who do not need any support. Assume that the support-needing user 134 intends to board on the vehicle 200 illustrated in FIG. 13.

In addition, assume that, the capture range of the imaging part (camera) 13 of the station-side announce apparatus 102a is an area 133a surrounded by a broken line in FIG. 13. In addition, assume that, the capture range of the imaging part (camera) 13 of the station-side announce apparatus 102b is an area 133b surrounded by a broken line in FIG. 13. In addition, assume that, the capture range of the imaging part (camera) 23 of the vehicle-side announce apparatus 202a is an area 233a surrounded by a broken line in FIG. 13. In addition, assume that, the capture range of the imaging part (camera) 23 of the vehicle-side announce apparatus 202b is an area 233b surrounded by a broken line in FIG. 13.

Herein, assume that, the support-needing user 134 enters the area 133a. In addition, assume that, the station-side announce apparatus 102a detected the support-needing user 134 from the capture image based on his appearance feature. In such case, the station-side announce apparatus 102a requests information relating to the pertinency to boarding to the vehicle-side announce apparatus 202a which registers to the boarding position 101a when the vehicle 200 stops.

The vehicle-side announce apparatus 202a obtains a capture image whose capture range is the area 233a and detects persons from the capture image. Herein, assume that, the number of persons appearing in the capture image whose capture range is the area 233a exceeds a predetermined number. In such case, the vehicle-side announce apparatus 202a determines that the vehicle door 201a is not pertinent to boarding. In addition, the vehicle-side announce apparatus 202a notifies the station-side announce apparatus 102a of the information indicating that the vehicle door 201a is not pertinent to boarding as the information relating to the pertinency to boarding.

When the station-side announce apparatus 102a receives the information relating to the pertinency to boarding, it announces that the vehicle door 201a is not pertinent to boarding. For example, the station-side announce apparatus 102a may provide notification (display, announce) that "a person who needs support upon boarding on, please follow a queue at another site".

After that, assume that, the support-needing user 134 has moved into the area 133b. In addition, assume that, the station-side announce apparatus 102b has detected the support-needing user 134 based on the capture image. In such case, the station-side announce apparatus 102b requests the information relating to the pertinency to boarding to the vehicle-side announce apparatus 202b which registers to the boarding position 101b when the vehicle 200 stops.

The vehicle-side announce apparatus 202b obtains the capture image whose capture range is the area 233b and detects persons from the capture image. Herein, assume that, the number of persons appearing in the capture image whose capture range is the area 233b is at the predetermined number or less. In such case, the vehicle-side announce apparatus 202b determines that the vehicle door 201b is pertinent to boarding. In addition, the vehicle-side announce apparatus 202b notifies the station-side announce apparatus 102b of information indicating that the vehicle door 201b is pertinent to boarding as the information relating to the pertinency to boarding.

When the station-side announce apparatus 102b receives the information relating to the pertinency to boarding, it announces that the vehicle door 201b is pertinent to boarding. For example, the station-side announce apparatus 102b may provide notification (display, announce) that "a person who needs support upon boarding on, please board on from this site".

As described above, in the announce system of the present example embodiment, the vehicle-side announce apparatus 202 determines crowd state in the vehicle 200 and notifies the station-side announce apparatus 102 of the pertinency of the boarding position(s). Thereby, the announce system of the present example embodiment contributes to that the support-needing user waiting for the vehicle 200 at the station 100 boards on the vehicle 200 while avoiding crowd in the vehicle 200.

Variant Example Embodiment 1

As a variant example embodiment 1 of the present example embodiment, the announce apparatus and the imaging apparatus may be different apparatuses like as the variant example embodiment 1 of the first example embodiment. Inner configuration of the announce apparatus 40, and the imaging apparatus 50 of the variant example embodiment 1 of the present example embodiment are the same as those illustrated in FIG. 11, thus detail explanation thereof is omitted.

Third Example Embodiment

The present example embodiment is an embodiment in which the vehicle-side announce apparatus determines the presence or absence of a vacant seat in a vehicle and at least either of the vehicle-side announce apparatus or the station-side announce apparatus announces the position of the vacant seat.

The entire configuration of the announce system of the present example embodiment is illustrated in FIG. 2. In the following explanation, differences from the announce system of the above example embodiments are explained in detail.

First, the vehicle-side announce apparatus 202 of the present example embodiment is explained in detail.

The inner configuration of the vehicle-side announce apparatus 202 of the present example embodiment is illustrated in FIG. 6. In the following explanation, differences from the vehicle-side announce apparatus 202 of the above example embodiments are explained in detail.

The analysis part 24 of the present example embodiment detects a vacant seat in the vehicle 200 based on the capture image obtained by the imaging part (camera) 23.

Concretely, when the communication part 22 received a request of notification of the position of the vacant seat from the station-side announce apparatus 102, the analysis part 24 determines the presence or absence of the vacant seat in the area corresponding to the capture image based on the capture image obtained by the imaging part (camera) 23. In a case where the analysis part 24 has determined that there is the vacant seat in an area corresponding to the capture image, the analysis part 24 replies, via the communication part 22, a position of the vacant seat to the station-side announce apparatus 102 which is a transmission source of the request for the position of the vacant seat. For example, the analysis part 24 may reply, to the station-side announce apparatus 102, where is the vacant seat on the right side, the left side or the front side relative to the vehicle door 201.

In addition, assume that, the communication part 22 receives the boarding on/off support information relating to the support-needing user. In such case, the announce part 25 provides notification (display, announce) of the information including at least any one of the notification that the support-needing user will board on the vehicle, the vehicle door 201 through which the support-needing user will board on and a property of the support-needing user as well as the position of the vacant seat as the boarding on/off support information relating to the support-needing user.

Next, the station-side announce apparatus 102 of the present example embodiment is explained in detail.

When the analysis part 14 of the present example embodiment detects the support-needing user, it requests the vehicle-side announce apparatus 202 assigned to the station-side announce apparatus 102 of the analysis part 14 to provide notification of the position of the vacant seat. In addition, assume that the communication part 12 receives the position of the vacant seat from the vehicle-side announce apparatus 202. In such case, the announce part 15 provides notification (display, announce) of the information including at least any one of the notification that the support-needing user will board on the vehicle, the vehicle door 201 through which the support-needing user will board on, and a property of the support-needing user as well as the position of the vacant seat as the boarding on/off support information relating to the support-needing user.

Figure 14:
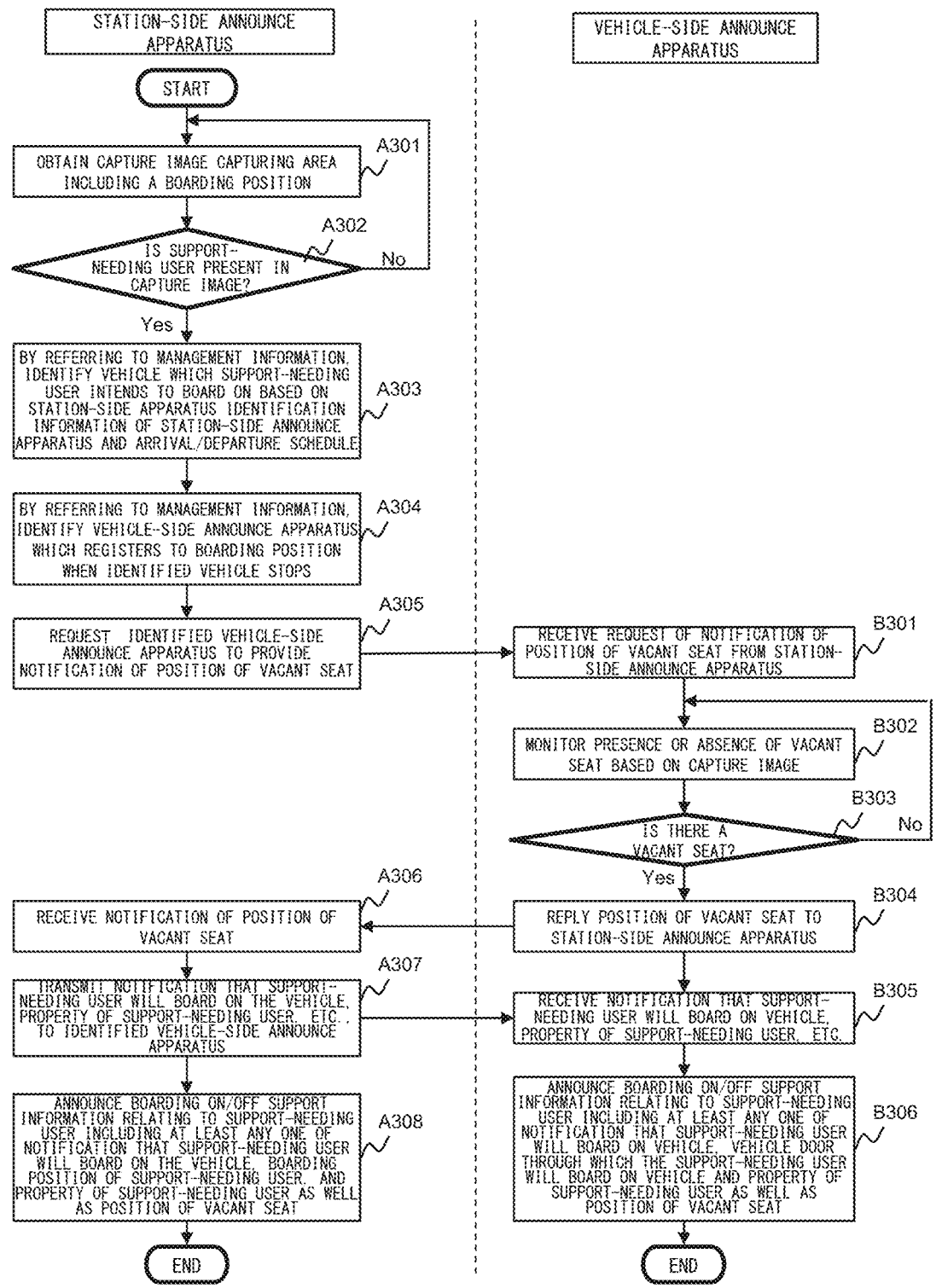
FIG. 14 is a flowchart showing a n example of operations by an announce system of a third example embodiment.

Next, while referring to FIG. 14, operations by the announce system of the present example embodiment are explained in detail. The processes of step A301 to step A304 are the same as the processes of step A201 to step A204 illustrated in FIG. 12, thus detail explanation thereof is omitted.

In step A305, the analysis part 14 of the station-side announce apparatus 102 requests the identified vehicle-side announce apparatus 202 to provide the notification of the position of the vacant seat via the communication part 12. The vehicle-side announce apparatus 202 receives the request of notification of the position of the vacant seat from the station-side announce apparatus 102 (step B301).

In step B302, the analysis part 24 of the vehicle-side announce apparatus 202 monitors the presence or absence of the vacant seat based on the capture image (step B302). The station-side announce apparatus 102 determines whether or not the vacant seat is present (step B303). In a case where there is no vacant seat (branching to No in step B303), the vehicle-side announce apparatus 202 returns to step B302 and continues the processes. In other words, in such case where there is no vacant seat (branching to No in step B303), the vehicle-side announce apparatus 202 continues the process of monitoring the presence or absence of the vacant seat.

On the other hand, in a case where there is a vacant seat (branching to Yes in step B303), the analysis part 24 of the vehicle-side announce apparatus 202 replies a position of the vacant seat to the station-side announce apparatus 102 via the communication part 22 (step B304). The station-side announce apparatus 102 receives the notification of the position of the vacant seat (step A306).

In step A307, the analysis part 14 of the station-side announce apparatus 102 transmits the notification that the support-needing user will board on the vehicle, a property of the support-needing user and the like to the identified vehicle-side announce apparatus 202 via the communication part 12. The vehicle-side announce apparatus 202 receives the notification that the support-needing user will board on the vehicle, a property of the support-needing user and the like (step B305).

The announce part 15 of the station-side announce apparatus 102 announces the boarding on/off support information relating to the support-needing user including at least any one of the notification that the support-needing user will board on the vehicle, the boarding position of the support-needing user, and a property of the support-needing user as well as the position of the vacant seat (step A308). In addition, the announce part 25 of the vehicle-side announce apparatus 202 announces the boarding on/off support information relating to the support-needing user including at least any one of the notification that the support-needing user will board on the vehicle, the vehicle door through which the support-needing user will board on the vehicle and the property of the support-needing user as well as the position of the vacant seat (step B306).

Figure 15:
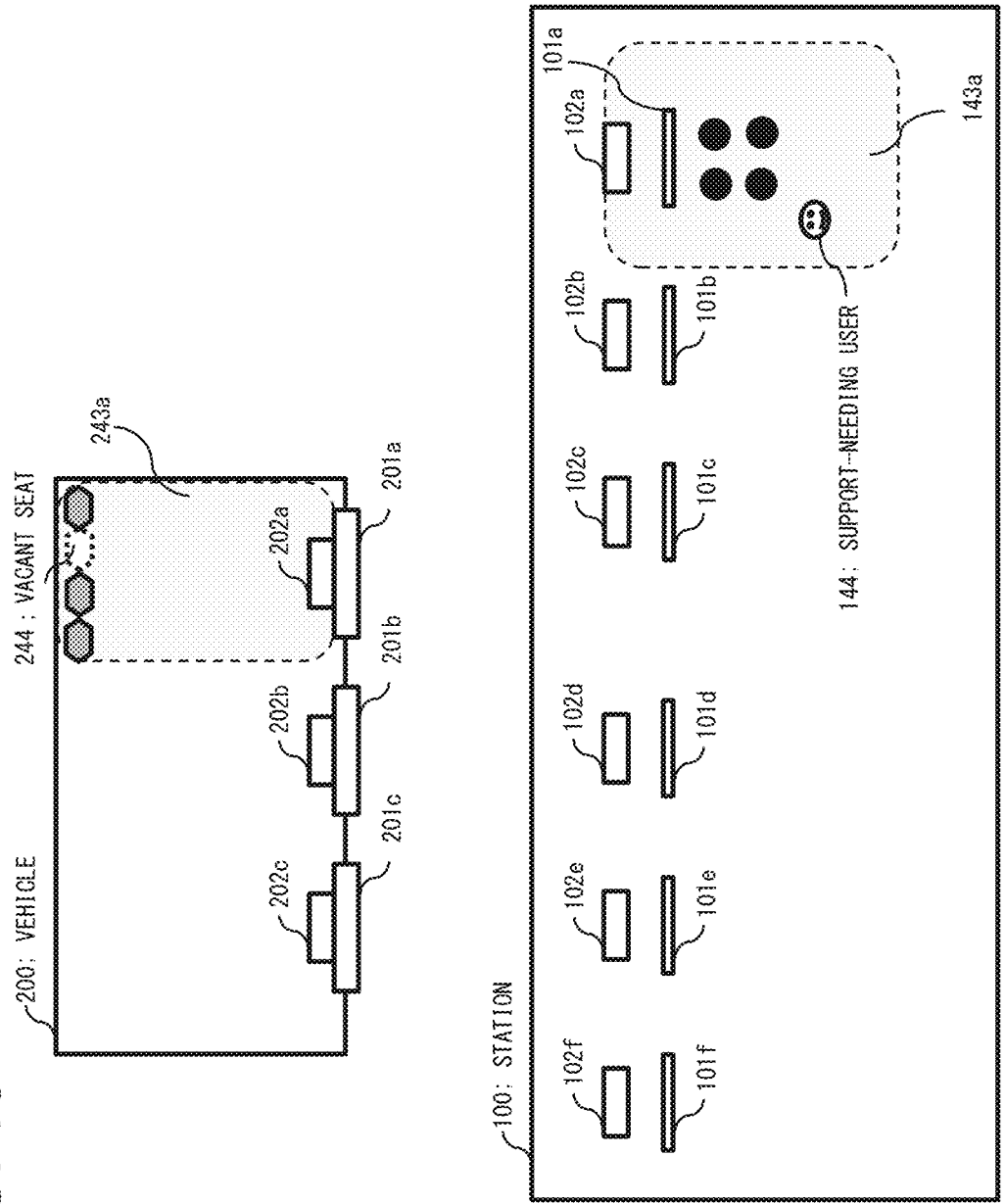
FIG. 15 is a diagram showing an example of a situation in which there is a vacant seat in the vehicle 200.

FIG. 15 is a diagram showing an example of a situation in which there is a vacant seat in the vehicle 200. Assume that, hexagons drawn with solid lines in FIG. 15 indicate a state that passengers sit thereon. In addition, assume that, black circles "•" illustrated in FIG. 15 indicate passengers who do not need support. In addition, assume that, the support-needing user 144 intends to board on the vehicle 200 illustrated in FIG. 15.

Further, assume that, the capture range of the imaging part (camera) 13 of the station-side announce apparatus 102*a* is an area 143*a* surrounded by a broken line in FIG. 15. Further, assume that the capture range of the imaging part (camera) 23 of the vehicle-side announce apparatus 202*a* is an area 243*a* surrounded by a broken line in FIG. 15. Assume that, there is a vacant seat 244 in the area 243*a*.

Herein, assume that the support-needing user 144 enters area 143*a*. In addition, assume that, the station-side announce apparatus 102*a* detects the support-needing user 144 based on the capture image. In such case, the station-side announce apparatus 102*a* requests notification of the position of the vacant seat to the vehicle-side announce apparatus 202*a* which registers to the boarding position 101*a* when the vehicle 200 stops.

The vehicle-side announce apparatus 202*a* obtains the capture image whose capture range is 243*a* and determines the presence or absence of the vacant seat based on the capture image. In a case where the vehicle-side announce apparatus 202*a* determines that there is the vacant seat 244 based on the capture image, the vehicle-side announce apparatus 202 replies the position of the vacant seat 244 to the station-side announce apparatus 102*a*. For example, assume that the vehicle-side announce apparatus 202*a* replies where is the vacant seat 244 on the right side, the left side or the front side relative to the vehicle door 201 as the position of the vacant seat to the station-side announce apparatus 102*a*. In such case, the vehicle-side announce apparatus 202*a* replies that the vacant seat 244 is present at the front side relative to the vehicle door 201 as the position of the vacant seat to the station-side announce apparatus 102*a*.

In a case where the station-side announce apparatus 102*a* receives the position of the vacant seat 244, it announces the boarding on/off support information relating to the support-needing user 144 including the position of the vacant seat 244. For example, assume that, the station-side announce apparatus 102*a* receives that the vacant seat 244 is present at the front side relative to the vehicle door 201 as the position of the vacant seat from the vehicle-side announce apparatus 202*a*. In such case, the station-side announce apparatus 102*a* may provide notification (display, announce) that "please make cooperation for offering the seat at the front side of a vehicle door which would stop at this position to the support-needing user". Thereby, it contributes to realize a situation where the passengers boarding on the vehicle together with the support-needing user 144 hesitate to sit on the vacant seat 244.

In addition, the vehicle-side announce apparatus 202*a* announces the boarding on/off support information relating to the support-needing user 144 including the position of the vacant seat 244. For example, assume that, the vehicle-side announce apparatus 202*a* replies that the vacant seat 244 is present at the front side relatively to the vehicle door 201 as the position of the vacant seat to the station-side announce apparatus 102*a*. In such case, the vehicle-side announce apparatus 202*a* may provide notification (display, announce) that "please make cooperation for offering the seat at the front side of this vehicle door to the support-needing user". Thereby, it contributes to realize a situation where the passengers on the vehicle 200 hesitate to sit on the vacant seat 244.

As described above, in the announce system of the present example embodiment, the vehicle-side announce apparatus 202 determines the presence or absence of the vacant seat in the vehicle 200 and at least any one of the vehicle-side announce apparatus 202 or the station-side announce apparatus 102 announces the position of the vacant seat.

By virtue that the vehicle-side announce apparatus 202 announces the boarding on/off support information relating to the support-needing user including the position of the vacant seat, it contributes to realize a situation where the passengers on the vehicle 200 hesitate to sit on the vacant seat when the support-needing user boards on the vehicle 200. In addition, by virtue that the station-side announce apparatus 102 announces the boarding on/off support information relating to the support-needing user including the position of the vacant seat, it contributes to realize a situation where the passengers boarding on the vehicle together with the support-needing user hesitate to sit on the vacant seat. Accordingly, the announce system of the present example embodiment contributes to increase the possibility that the support-needing user may take a seat.

Variant Example Embodiment 1

As a variant example embodiment 1 of the present example embodiment, the announce apparatus and the imaging apparatus may be different apparatuses like as the variant example embodiment 1 of the first example embodiment. Inner configurations of the announce apparatus 40 and the imaging apparatus 50 of the variant example embodiment 1 of the present example embodiment are illustrated in FIG. 11, thus detail explanations thereof are omitted.

Fourth Example Embodiment

The present example embodiment is an example embodiment in which an announce control apparatus obtains the capture image from at least any one of the station-side announce apparatus and the vehicle-side announce apparatus so as to execute processes based on the obtained capture image, such as a process of determining the presence or absence of the support-needing user, a process of determining whether or not the support-needing user will board on/off the vehicle, and the like.

Figure 16:
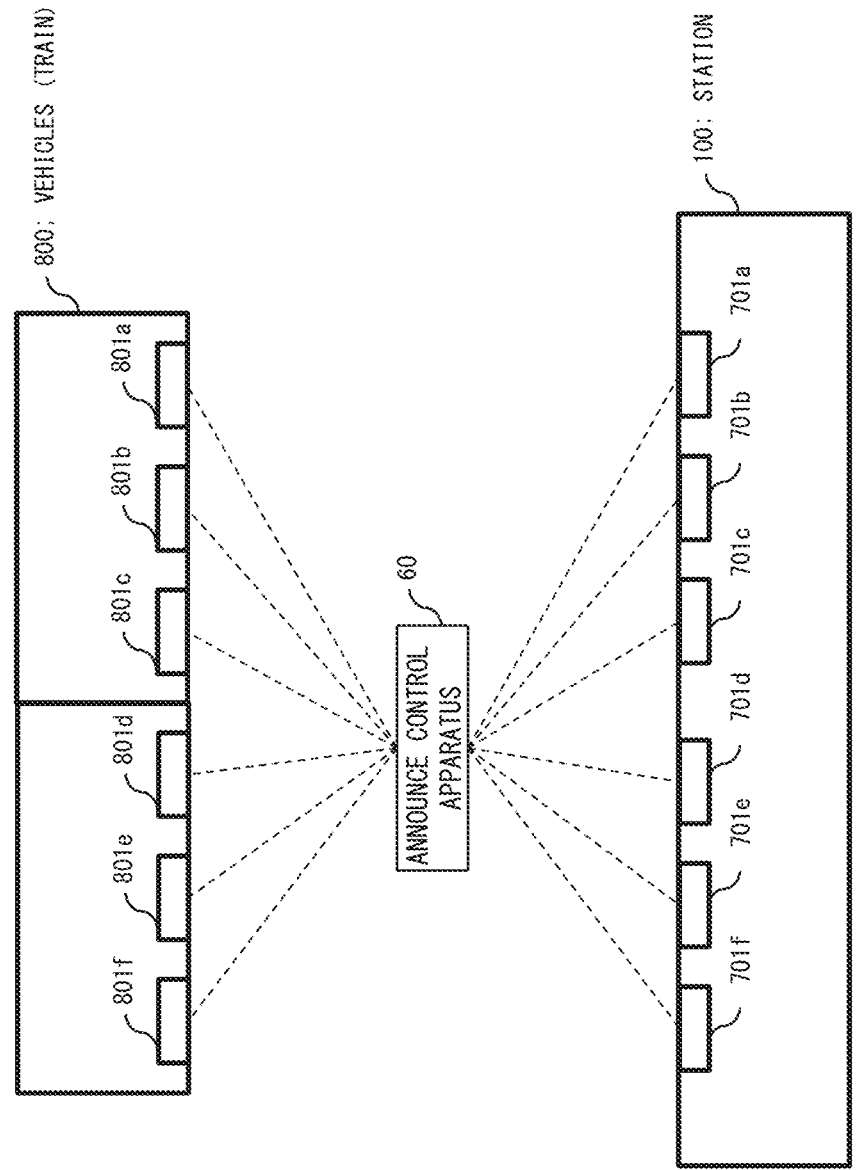
FIG. 16 is a block diagram showing an example of an entire configuration of an announce system of a fourth example embodiment.

FIG. 16 is a block diagram showing an example of an entire configuration of the announce system of the present example embodiment. The announce system of the present example embodiment is configured by comprising an announce control apparatus (announce controller) 60.

Assume that, the station-side announce apparatuses 701*a* to 701*f* are arranged in the station 100 illustrated in FIG. 16. Assume that, the vehicle-side announce apparatuses 801*a* to 801*f* are arranged in the vehicles (train) 800 illustrated in FIG. 16.

In the following explanation, the station-side announce apparatuses 701*a* to 701*f* are referred to as "station-side announce apparatus 701" in a case where it is not required to discriminate one another. In addition, in the following explanation, the vehicle-side announce apparatuses 801*a* to 801*f* are referred to as "vehicle-side announce apparatus 801" in a case where it is not required to discriminate one another. Further, although FIG. 16 illustrates 6 pieces of the station-side announce apparatuses 701*a* to 701*f* and 6 pieces of the vehicle-side announce apparatuses 801*a* to 801*f*, it is not intended to limit the number of the station-side announce apparatus 701 and the vehicle-side announce apparatus 801 to 6 in the announce system of the present example embodiment.

The announce control apparatus 60 obtains the capture image from at least any one of the station-side announce apparatus 701 and the vehicle-side announce apparatus 801, and executes processes based on the obtained capture image, such as the process of determining the presence or absence of the support-needing user, the process of determining that the support-needing user will board on/off the vehicle, and the like. In other words, the announce control apparatus 60 executes processes corresponding to the functions of the analysis parts 14, 24 of the above example embodiments. In addition, the announce control apparatus 60 notifies at least any one of the station-side announce apparatus 701 and the vehicle-side announce apparatus 801 of an analysis result (the presence or absence of the support-needing user, information that support-needing user will board on/off the vehicle, and the like).

Figure 17:
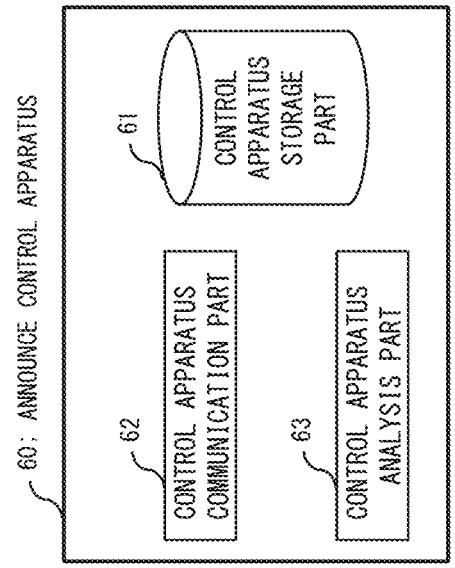
FIG. 17 is a block diagram showing an example of inner configuration of an announce control apparatus 60 of the fourth example embodiment.

FIG. 17 is a block diagram showing an example of the inner configuration of the announce control apparatus 60. The announce control apparatus 60 is configured by comprising a control apparatus storage part 61, a control apparatus communication part 62 and a control apparatus analysis part 63.

The control apparatus storage part 61 stores the management information in which the arrival/departure schedule, the vehicle identification information and the announce apparatus concordance information are associated.

The control apparatus communication part 62 communicates with 2 or more station-side announce apparatuses 701 and 2 or more vehicle-side announce apparatuses 801 via a network. The control apparatus communication part 62 receives the capture image transmitted from at least any one of the station-side announce apparatus 701 and the vehicle-side announce apparatus 801. In addition, the control apparatus communication part 62 transmits the boarding on/off support information relating to the support-needing user to at least any one of the station-side announce apparatus 701 and the vehicle-side announce apparatus 801. The boarding on/off support information relating to the support-needing user is the same as that described above, thus detail explanation thereof is omitted.

The control apparatus analysis part 63 obtains the capture image capturing at least any one of the area including the boarding position at the station or inside of the vehicle. In addition, the control apparatus analysis part 63 detects the support-needing user from the capture image based on his appearance feature and determines whether the support-needing user will board on/off the vehicle based on the capture image. The control apparatus analysis part 63 obtains the capture image from the 2 or more station-side announce apparatuses 701 and the 2 or more vehicle-side announce apparatuses 801, and determines the presence or absence of the support-needing user in the capture images with respect to each of the station-side announce apparatuses 701 and each of the vehicle-side announce apparatuses 801 so as to determine whether the support-needing user will board on/off the vehicle.

In a case where the control apparatus analysis part 63 obtains the capture image from the station-side announce apparatus 701, detail processes executed by the control apparatus analysis part 63 are the same those by the analysis part 14 of the station-side announce apparatus 102 of the above example embodiment, thus detail explanation thereof is omitted. Similarly, in a case where the control apparatus analysis part 63 obtains the capture image from the vehicle-side announce apparatus 801, detail processes executed by the control apparatus analysis part 63 are the same as those by the analysis part 24 of the vehicle-side announce apparatus 202 of the above example embodiments, thus detail explanation thereof is omitted.

Figure 18:
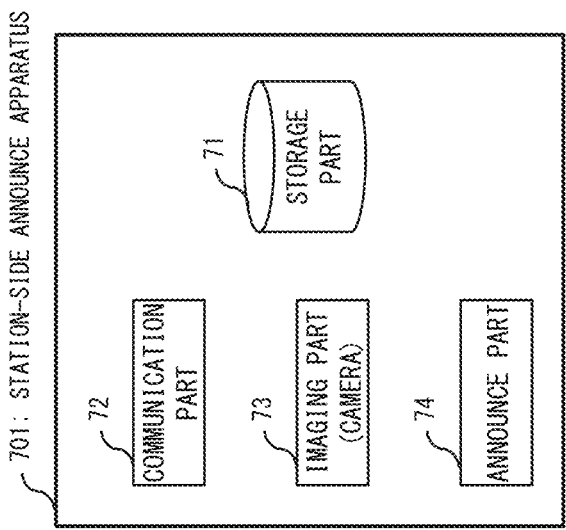
FIG. 18 is a block diagram showing an example of inner configuration of a station-side announce apparatus 701 of the fourth example embodiment.

FIG. 18 is a block diagram showing an example of the inner configuration of the station-side announce apparatus 701 of the present example embodiment. The station-side announce apparatus 701 is configured by comprising a storage part 71, a communication part 72, an imaging part 73 and an announce part 74.

The storage part 71 stores illustration, animation, voice, etc., for announcing the boarding on/off support information relating to the support-needing user.

The communication part 72 communicates with the announce control apparatus 60 via a network. Concretely, the communication part 72 transmits the capture image captured by the imaging part (camera) 73 (the capture image capturing the area including the boarding position at the station 100) to the announce control apparatus 60. In addition, the communication part 72 receives the boarding on/off support information relating to the support-needing user from the announce control apparatus 60.

The imaging part (camera) 73 captures the area including the boarding position at the station 100 to generate the capture image. The imaging part (camera) 73 is the same as the imaging part (camera) 13 of the above example embodiments, thus detail explanation thereof is omitted.

The announce part 74 announces the boarding on/off support information relating to the support-needing user, which is received by the communication part 72 from the announce control apparatus 60, using at least any one of the capture image, illustration and animation. Detail of the announce part 74 is the same as the announce part 15 of the above example embodiments, thus detail explanation thereof is omitted.

Figure 19:
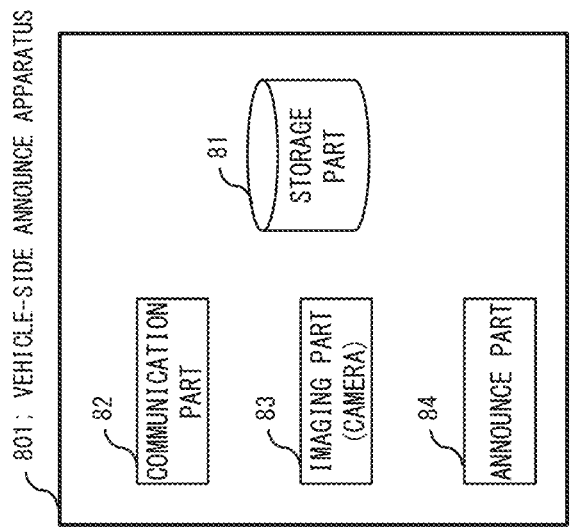
FIG. 19 is a block diagram showing an example of inner configuration of a vehicle-side announce apparatus 801 of the fourth example embodiment.

FIG. 19 is a block diagram showing an example of the inner configuration of the vehicle-side announce apparatus 801 of the present example embodiment. The vehicle-side announce apparatus 801 is configured by comprising a storage part 81, a communication part 82, an imaging part 83 and an announce part 84.

The storage part 81 stores illustration, animation, voice, etc., for announcing the boarding on/off support information relating to the support-needing user.

The communication part 82 communicates with the announce control apparatus 60 via a network. Concretely, the communication part 82 transmits the capture image captured by the imaging part (camera) 83 (the capture image capturing inside of the vehicle 800) to the announce control apparatus 60. In addition, the communication part 82 receives the boarding on/off support information relating to the support-needing user from the announce control apparatus 60.

The imaging part (camera) 83 captures images of inside of the vehicle 800 to generate the capture image. The imaging part (camera) 83 is the same as the imaging part (camera) 23 of the above example embodiments, thus detail explanation thereof is omitted.

The announce part 84 announces the boarding on/off support information relating to the support-needing user, which is received by the communication part 72 from the announce control apparatus 60, using at least any one of the capture image, illustration and animation. Detail of the announce part 84 is the same as the announce part 25 of the above example embodiments, thus detail explanation thereof is omitted.

As described above, in the announce system of the present example embodiment, the announce control apparatus 60 obtains the capture images from the plurality of station-side announce apparatuses 701 and the plurality of vehicle-side announce apparatuses 801. In addition, in the announce system of the present example embodiment, executes processes based on the obtained capture images, such as the process of determining the presence or absence of the support-needing user, the process of determining whether the support-needing user will board on/off the vehicle, and the like. Therefore, in the announce system of the present example embodiment, the capture images may be collected in the announce control apparatus 60 so that the station-side announce apparatus 701 provides the support-needing user of notification (display, announce) of the boarding position pertinent to boarding including a vehicle door which is different from a vehicle door through which the support-needing user intends to board on the vehicle.

In addition, the announce system of the present example embodiment contributes to reduce processing load of the station-side announce apparatus 701 and the vehicle-side announce apparatus 801 by virtue that the announce control apparatus 60 executes the processes, such as the process of determining the presence or absence of the support-needing user, the process of determining whether or not the support-needing user will board on/off the vehicle, and the like.

Further, the announce system of the present example embodiment contributes to quickly announce the boarding on/off support information relating to the support-needing user by virtue that the announce control apparatus 60 executes the processes, such as the process of determining the presence or absence of the support-needing user, the process of determining whether or not the support-needing user will board on/off the vehicle.

Next, a computer (s) realizing (implementing) the station-side announce apparatus (102, 701) and the vehicle-side announce apparatus (202, 801) of the above example embodiments are explained.

Figure 20:
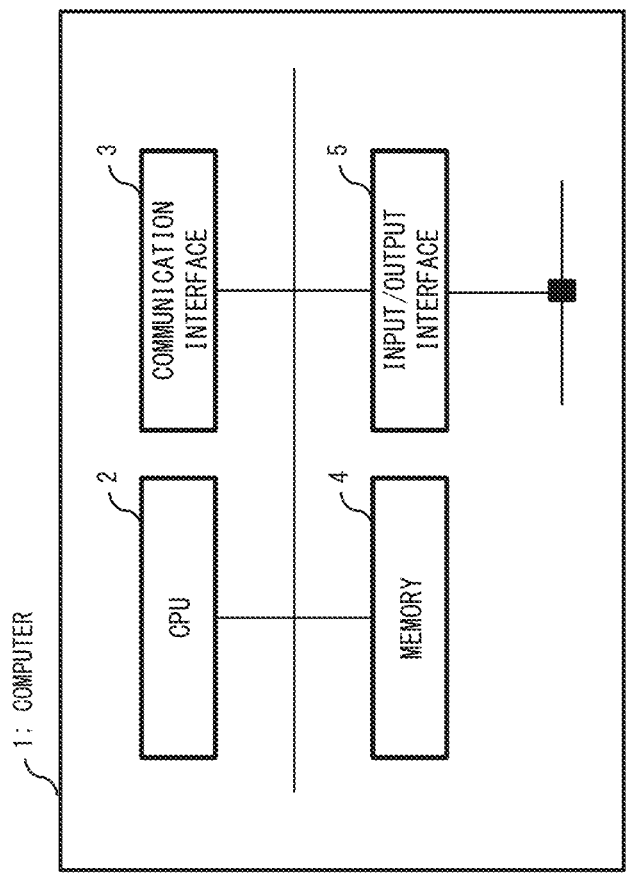
FIG. 20 is a block diagram showing an example of hardware configuration of a computer 1.

FIG. 20 is a block diagram showing an example of hardware configuration of a computer 1 implementing the station-side announce apparatus 102 and the vehicle-side announce apparatus 202.

For example, the computer 1 comprises CPU (Central Processing Unit) 2, a communication interface 3, a memory 4, an input/output interface 5, etc., which are mutually connected by an inner bus. The communication interface 3 is NIC (Network Interface Card), etc. The memory 4 is a magnet disk apparatus, an optical disk apparatus, a semiconductor memory, and the like. The input/output interface 5 is an interface for an LCD, a loudspeaker and an input apparatus. The input apparatus is a touch panel, a microphone and the like.

The functions of the station-side announce apparatus 102 and the vehicle-side announce apparatus 202 are implemented by CPU 2 that executes program(s) stored in the memory 4. Entire or a part of the functions of the station-side announce apparatus 102 and the vehicle-side announce apparatus 202 may be implemented by a hardware (installed as a hardware), such as FPGA (Field Programmable Gate Array), ASIC (Application Specific Integrated Circuit) and the like. In addition, the program(s) may be downloaded via a network or updated using a storage medium storing the program (s). Further, the functions of the station-side announce apparatus 102 and the vehicle-side announce apparatus 202 may be implemented by a semiconductor chip. That is, the functions of the station-side announce apparatus 102 and the vehicle-side announce apparatus 202 may be implemented by virtue that a certain hardware executes a software (s).

Further, the computer 1 implementing the station-side announce apparatus 102 and the vehicle-side announce apparatus 202 may be configured by comprising a camera (s).

Herein, the basic hardware configurations of the computer(s) implementing the station-side announce apparatus 701, the vehicle-side announce apparatus 801, and the announce control apparatus 60 are also the same as that of the station-side announce apparatus 102 and the vehicle-side announce apparatus 202, thus detail explanation thereof is omitted.

In the explanation above, explained are embodiments in which one station-side announce apparatus 102 assigned to the boarding position of the support-needing user and the vehicle door through which the support-needing user boards off the vehicle announces the boarding on/off support information relating to the support-needing user. However, it is not intended to limit to the embodiment in which one station-side announce apparatus 102 assigned to the boarding position of the support-needing user and the vehicle door through which the support-needing user boards off the vehicle announces the boarding on/off support information relating to the support-needing user. It is of course possible that 2 or more station-side announce apparatuses 102 arranged at the station 100 may announce the same boarding on/off support information relating the same support-needing user.

Similarly, in the explanation above, explained are example embodiments in which one vehicle-side announce apparatus 202 assigned to the boarding position of the support-needing user or the vehicle door through which the support-needing user boards off the vehicle announces the boarding on/off support information relating to the support-needing user. However, it is not intended to limit to the example embodiment in which one vehicle-side announce apparatus 202 assigned to the boarding position of the support-needing user or the vehicle door through which the support-needing user boards off the vehicle announces the boarding on/off support information relating to the support-needing user. It is of course possible that 2 or more vehicle-side announce apparatuses 202 in the vehicle 200 may announce the same boarding on/off support information relating the support-needing user.

Although a part or the entire of the above example embodiments may be described as the following modes, but not limited thereto.

(Mode 1) See the announce apparatus according to the first aspect above.

(Mode 2) The announce apparatus according to Mode 1, wherein
the analysis part determines a property of the support-needing user based on his appearance feature, and
the boarding on/off support information includes at least one selected from information that the support-needing user will board on or off the vehicle, a position of the support-needing user, and the property.

(Mode 3) The announce apparatus according to Mode 1 or 2, wherein
the boarding on/off support information includes information relating to a boarding position pertinent to boarding.

(Mode 4) The announce apparatus according to any one of Modes 1 to 3, wherein
the announce part announces the boarding on/off support information using at least any one of the capture image, an illustration or an animation.

(Mode 5) The announce apparatus according to Mode 4, wherein the imaging part captures movie image, and the announce part announces the boarding on/off support information using at least any one of the capture image, and the static image, illustration, animation extracted from the capture image.

(Mode 6) The announce apparatus according to any one of Modes 1 to 5, wherein the announce part reduces visibility of a facial area included in the capture image in a case where the announce is performed using the capture image.

(Mode 7) The announce apparatus according to any one of Modes 1 to 6, wherein the analysis part determines whether or not that the support-needing user intends to board on the vehicle based on a position of the support-needing user.

(Mode 8) The announce apparatus according to any one of Modes 1 to 7, wherein the analysis part determines actions (behaviors) of the support-needing user based on the capture image so as to determine whether or not that support-needing user will board off the vehicle.

(Mode 9) See the announce control apparatus according to the above second aspect.

(Mode 10) See the announce system according to the above third aspect.

(Mode 11) The announce system according to Mode 10, wherein the station-side announce apparatus is assigned to at least one boarding position, the vehicle-side announce apparatus is assigned to at least one vehicle door, and communication is executed between the station-side announce apparatus and the vehicle-side announce apparatus respectively assigned to the boarding position and the vehicle door which register one another when the vehicle stops at the station.

(Mode 12) The announce system according to Mode 10 or 11, wherein the second analysis part presumes a crowd state in the vehicle based on the second capture image, determines whether or not that it is pertinent to boarding based on the crowd state, and notifies the station-side announce apparatus of information relating to pertinency to boarding, and the first announce part announces the information relating to the pertinency to boarding that is notified from the vehicle-side notification apparatus.

(Mode 13) The announce system according to any one of Modes 10 to 12, wherein the second analysis part detects a vacant seat on the vehicle based on the second capture image, and the boarding on/off support information relating to the first support-needing user includes a position of the vacant seat.

(Mode 14) The announce system according to any one of Modes 10 to 13, wherein the announce system further comprises:

a control apparatus analysis part that obtains at least any one of the first capture image and the second capture image so as to determine whether or not the support-needing user will board on/off the vehicle based on at least any one of the first capture image and the second capture image, and a control apparatus communication part that notifies at least any one of the station-side announce apparatus and the vehicle-side announce apparatus of the boarding on/off support information relating to the support-needing user.

(Mode 15) See the announce method according to the above fourth aspect.

(Mode 16) See the program according to the above fifth aspect.

Herein, the disclosure of the above Patent Literature is incorporated herein by reference thereto, and may be used as a basis or a part(s) of the present invention, as necessary. Variations and adjustments of the example embodiments are possible within the ambit of the entire disclosure (including the claims) of the present invention and based on the basic technical concept of the present invention. Various combinations and selections (including non-selection) of various disclosed elements (including each element in each claim, each example embodiment, each drawing, etc.) are possible within the ambit of the entire disclosure the present invention. Namely, the present invention of course includes various variations and modifications that could be made by those skilled in the art according to the overall disclosure including the claims and the technical concept. Particularly, a numerical value range described in the present description should be interpreted as describing arbitrary numerical values or small ranges included in the ranges, even if they are not described explicitly. It is apparent that a computer(s) is/are used in the present invention, in a case where an algorithm (s), a software (s), a flowchart(s) or an automated process step(s) is described. It is also apparent that the computer is equipped with a processor and a memory or a storage apparatus. Therefore, it is understood that the present application reasonably describes these elements even if they are not explicitly described.

REFERENCE SIGNS LIST 1 computer
2 CPU
3 communication interface
4 memory
5 input/output interface
11, 21, 41, 71, 81 storage part
12, 22, 42, 51, 72, 82 communication part
13, 23, 52, 73, 83 imaging part (camera)
14, 24, 44, 1001 analysis part
15, 25, 45, 74, 84, 1002 announce part
40, 1000 announce apparatus
43 image obtaining part
50 imaging apparatus
60 announce control apparatus (announce controller)
61 control apparatus storage part
62 control apparatus communication part
63 control apparatus analysis part
100 station
101, 101a to 101f boarding position
102, 102a to 102f, 701a to 701f station-side announce apparatus
103a, 103b, 113a, 133a, 133b, 143a, 203a, 203b, 223a, 233a, 233b, 243a area
114, 134, 144, 224 support-needing user
200 vehicle
200a, 200b, 800 vehicles (train)
201, 201a to 201c vehicle door
202, 202a to 202c, 801a to 801f vehicle-side announce apparatus
244 vacant seat
351, 352 rail track

What is claimed is:

1. A notification system comprising:
at least one memory storing instructions; and
at least one processor configured to execute the instructions to:
detect a person from a first image capturing inside of a vehicle;
estimate a crowd state in the vehicle based on a number of persons detected from the first image;
determine whether or not boarding is pertinent for a support-needing person based on the number of the persons detected from the first image; and
output information relating to pertinency to boarding.

2. The notification system according to claim 1, wherein the at least one processor is configured to execute the instruction to:
count number of persons detected from the first image; and
determine that it is not pertinent for the support-needing person to boarding in a case where the number of the persons exceeds a predetermined number.

3. The notification system according to claim 2, wherein the at least one processor is configured to execute the instructions to estimate the crowd state in the vehicle, in a case of receiving a request for the information relating to the pertinency to boarding from a station-side apparatus.

4. The notification system according to claim 1, wherein the at least one processor is further configured to execute the instruction to:
determine a presence or absence of a vacant seat based on the first image capturing inside of the vehicle; and
output information relating a position of the vacant seat.

5. A notification method comprising:
detecting a person from a first image capturing inside of a vehicle;
estimating a crowd state in the vehicle based on a number of persons detected from the first image;
determining whether or not boarding is pertinent for a support-needing person based on the number of the persons detected from the first image; and
outputting information relating to pertinency to boarding.

6. The notification method according to claim 5, further comprising:
counting number of persons detected from the first image; and
determining that it is not pertinent for the support-needing person to boarding in a case where the number of the persons exceeds a predetermined number.

7. The notification method according to claim 6, further comprising:
estimating the crowd state in the vehicle, in a case of receiving a request for the information relating to the pertinency to boarding from a station-side apparatus.

8. The notification method according to claim 5, further comprising:
determining a presence or absence of a vacant seat based on the first image capturing inside of the vehicle; and
outputting information relating a position of the vacant seat.

9. A non-transitory computer-readable medium storing a notification program that causes a computer to execute the processes of:
detecting a person from a first image capturing inside of a vehicle;
estimating a crowd state in the vehicle based on a number of persons detected from the first image;
determining whether or not boarding is pertinent for a support-needing person based on the number of the persons detected from the first image; and
outputting information relating to pertinency to boarding.

* * * * *